United States Patent
MacMillan

(10) Patent No.: US 6,468,084 B1
(45) Date of Patent: Oct. 22, 2002

(54) SYSTEM AND METHOD FOR LITERACY DEVELOPMENT

(75) Inventor: Philip MacMillan, Exmouth (GB)

(73) Assignee: Beacon Literacy, LLC, Old Hickory, TN (US)

( * ) Notice: Subject to any disclaimer, the term of this patent is extended or adjusted under 35 U.S.C. 154(b) by 32 days.

(21) Appl. No.: 09/637,952

(22) Filed: Aug. 11, 2000

Related U.S. Application Data

(60) Provisional application No. 60/148,912, filed on Aug. 13, 1999.

(51) Int. Cl.⁷ ................................................. G09B 5/00
(52) U.S. Cl. ........................ 434/185; 434/156; 434/169
(58) Field of Search ................................ 434/112, 118, 434/157, 162, 167, 169, 185, 307 R, 308, 309, 319, 323, 362, 365; 704/1, 3, 246, 249, 251, 254–257, 270, 270.1, 271, 276; 600/23, 300, 383, 586, 590, 595, 905; 340/566, 573.1, 573.6; 73/379.01; 381/1, 17; 367/198; 379/67.1; 706/927; 705/24; 708/167, 172; 713/100

(56) References Cited

U.S. PATENT DOCUMENTS

| | | | | |
|---|---|---|---|---|
| 3,453,749 A | * | 7/1969 | Snedeker, Jr. ............... | 434/112 |
| 4,060,848 A | * | 11/1977 | Hyatt ........................ | 708/172 |
| 4,143,648 A | * | 3/1979 | Cohen et al. ................. | 600/23 |
| 4,310,002 A | * | 1/1982 | Takinishi et al. ............ | 600/383 |
| 4,472,833 A | * | 9/1984 | Turrell et al. ................. | 381/56 |
| 4,615,680 A | * | 10/1986 | Tomatis ...................... | 434/157 |
| 4,636,876 A | * | 1/1987 | Schwartz ...................... | 360/2 |
| 5,061,186 A | * | 10/1991 | Jost et al. .................... | 434/185 |
| 5,146,208 A | * | 9/1992 | Parra ........................ | 340/573.6 |
| 5,302,132 A | * | 4/1994 | Corder ....................... | 434/156 |
| 5,362,240 A | * | 11/1994 | Cave et al. .................. | 434/157 |
| 5,429,513 A | * | 7/1995 | Diaz-Plaza .................. | 434/167 |
| 5,487,113 A | * | 1/1996 | Mark et al. ..................... | 381/17 |
| 5,487,671 A | * | 1/1996 | Shpiro et al. ................ | 434/185 |
| 5,634,086 A | * | 5/1997 | Rtischev et al. ............. | 704/270 |
| 5,660,176 A | * | 8/1997 | Iliff ............................ | 600/300 |
| 5,766,015 A | * | 6/1998 | Shpiro ......................... | 434/156 |
| 5,768,586 A | * | 6/1998 | Zweben et al. ............. | 713/100 |

FOREIGN PATENT DOCUMENTS

JP          11-265199        *   9/1999

OTHER PUBLICATIONS

Brady, "Ability to Encode Phonological Representations: An Underlying Difficulty of Poor Readers"; (1997); pp. 21–47.
Foorman, B. R. et al.; "The Case For Early Reading Intervention". Cognitive and Linguistic Foundations of Reading Acquisition: Implications for Intervention; (1997); Mahwah, New Jersey: Lawrence Erlbaum and Associates, pp. 243–263.

(List continued on next page.)

*Primary Examiner*—Joe H. Cheng
(74) *Attorney, Agent, or Firm*—Waddey & Patterson; I. C. Waddey, Jr.

(57) ABSTRACT

An integrated method which uses multiple sensory materials with a voice recording and playback system. The system teaches multiple parts of a language by a series program covering each aspect of a language. Aspects covered by the program include sound word teaching, sentence teaching, spelling word teaching, and writing teaching. The system teaches initial letter sounds, vowel sounds, consonant sound, consonant combinations, spelling alternatives, the addition of endings to works, making plural words, and spelling rules. The system progresses into additional sessions by adding additional spelling, increasing the difficulty of the words used, and adding dictation passages to translate words and sentences into thought processes.

1 Claim, 16 Drawing Sheets

OTHER PUBLICATIONS

Helmstetter, Shad.; "What to say when you talk to yourself;" (1986); Grindle Press.

Macmillan, P.; "Self Talk: Student Voice As Teacher"; LIRA (Spring 1996); pp. 18–20; Published by the Calgary & District Council of the International Reading Association.

Pinnel, G.S. et al.; "Comparing instructional models for the literacy education of high risk first graders"; Reading Research Quarterly, 29, (1994) pp. 9–38.

Shanhan, T & Barr, R.; "Reading Recovery: An independent evaluation of the effects of an early instructional intervention for at—risk learners", Reading Research Quarterly, 30; (1995); pp. 958, 960–996.

Vellutino et al.; "Phonological Awareness and Reading Ability: Evidence from a Longitudinal and Experimental Study". Merrill Palmer Quarterly, 33; (1987); pp. 331–363.

Wagner et al.; "The Nature of Phonological Processing and Its Causal Role in the Acquistion of Reading Skills"; Psychological Bulletin, 101; (1987); pp. 193–212.

Speilberger, C.; "Theory and Research on Anxiety"; (1966–1978); pp. 3–20.

Speilberger, C. et al.; "Examination Stress and Test Anxiety"; (1966–1978); pp. 167–191.

* cited by examiner

The "a" sound —— 12

Words:  at bat cat hat can ran man as has gas
        ask cap lap am jam ham Sam mat fat cap  } —14

Sentences:

Sam has a cap and a hat.          I am at the mat.
Ask a fat man.                    Sam ran a lap.
Can I ask the man?                The fat cat has jam.
Has the fat cat ran at Sam?       The cat had a bat.
The car has gas.

Master Speller:

Nonsense words spell:  vap jat pab lan sav cag maj gan } —18
Real words spell:      ask lap can jam hat mad pal map sat fan } —20

*Tough words spell: does goes what } —22

What would bat sound like if you changed the "t" to "d"?
    cat              "c" to "f"?
    cat              "a" to "o"?
    ham              "h" to "s"?
    Sam              "a" to "u"?

What would fat sound like if you did not say the f ?

Now go back to the sentences and underline all the words that have the "a" sound in them.

* If the student can work out and say these words easily then do not record, if the student finds it difficult then get the student to sound out and blend the letter sounds, record only the blended word not the sounding out. The student is to spell these words as a part of the practice session.

** Cover the words and see if the student can spell the words, if successful then do not record otherwise record only those that words that were unknown. The student's task is to spell these words as a part of the practice session.

FIG. 1

Results School A

E. Group

| Init. | Grd | Pre | Post | d |
|---|---|---|---|---|
| Jo | 2 | 0.0 | 1.3 | +1.3 |
| Sh | 2 | 1.0 | 3.6 | +2.6 |
| Re | 2 | 1.0 | 3.6 | +2.6 |
| Le | 3 | 1.8 | 4.3 | +2.5 |
| Sa | 3 | 2.2 | 3.8 | +1.6 |
| Br | 3 | 1.8 | 3.6 | +1.8 |
| Bl | 3 | 0.5 | 2.0 | +1.5 |
| Ja | 4 | 2.8 | 5.6 | +2.8 |
| BJ | 4 | 3.8 | 5.6 | +1.8 |
| Br | 6 | 0.0 | 2.5 | +2.5 |

Average increase in word recognition = 2.10 grades

*FIG. 3*

Results School A

C. Group

| Init. | Grd | Pre | Post | d |
|---|---|---|---|---|
| J | 2 | 0.3 | 0.3 | 0.0 |
| T | 2 | 1.8 | 1.9 | +0.9 |
| Tj | 1 | 0.0 | 0.0 | 0.0 |
| Rb | 1 | 0.0 | 0.0 | 0.0 |
| Jb | 5 | 3.8 | 3.8 | 0.0 |
| Jn | 5 | 3.6 | 3.8 | +0.2 |
| Am | 6 | 3.5 | 3.7 | +0.2 |
| Ke | 6 | 4.5 | 4.6 | +0.2 |
| Du | 4 | 3.2 | 3.2 | 0.0 |
| Co | 6 | 5.6 | 5.8 | +0.2 |

Average increase in word recognition = 0.17 grades

*FIG. 4*

School B

E. Group

| Init | Grd | Pre | Post | d |
|---|---|---|---|---|
| Dt | 4 | 1.3 | 2.7 | +1.4 |
| Lt | 4 | 1.5 | 3.1 | +1.6 |
| Ma | 2 | 1.3 | 2.2 | +0.9 |
| An | 2 | 1.5 | 2.9 | +1.4 |
| Go | 3 | 0.0 | 1.3 | +1.3* |
| Je | 5 | 4.3 | 5.6 | +1.3 |
| Ke | 4 | 2.2 | 3.6 | +1.4 |
| Wh ** | 3 | 0.5 | 2.1 | +1.4 |

Average increase in word recognition = 1.28 Grades

* Independent testing by the school just prior to program start was 40% on an Accelerated Reader Test, after 8 sessions this score had increased to 100%. Student ** passed for the first time ever an Accelerated Reader Test at session seven.

FIG. 5

School B

C. Group

| Init. | Grd | Pre | Post | d |
|---|---|---|---|---|
| Mi | 3 | 3.0 | 3.1 | +0.1 |
| Tr | 3 | 2.8 | 2.7 | -0.1 |
| Ar | 2 | 2.5 | 2.6 | +0.1 |
| Ly | 3 | 4.3 | 4.8 | +0.5 |
| Rv | 4 | 1.1 | 1.2 | +0.1 |
| Je | 4 | 0.0 | 0.0 | 0.0 |
| D e | 4 | 3.1 | 3.0 | -0.1 |
| Ah | 3 | 1.4 | 1.4 | 0.0 |

Average increase in word recognition = 0.14 grades

FIG. 6

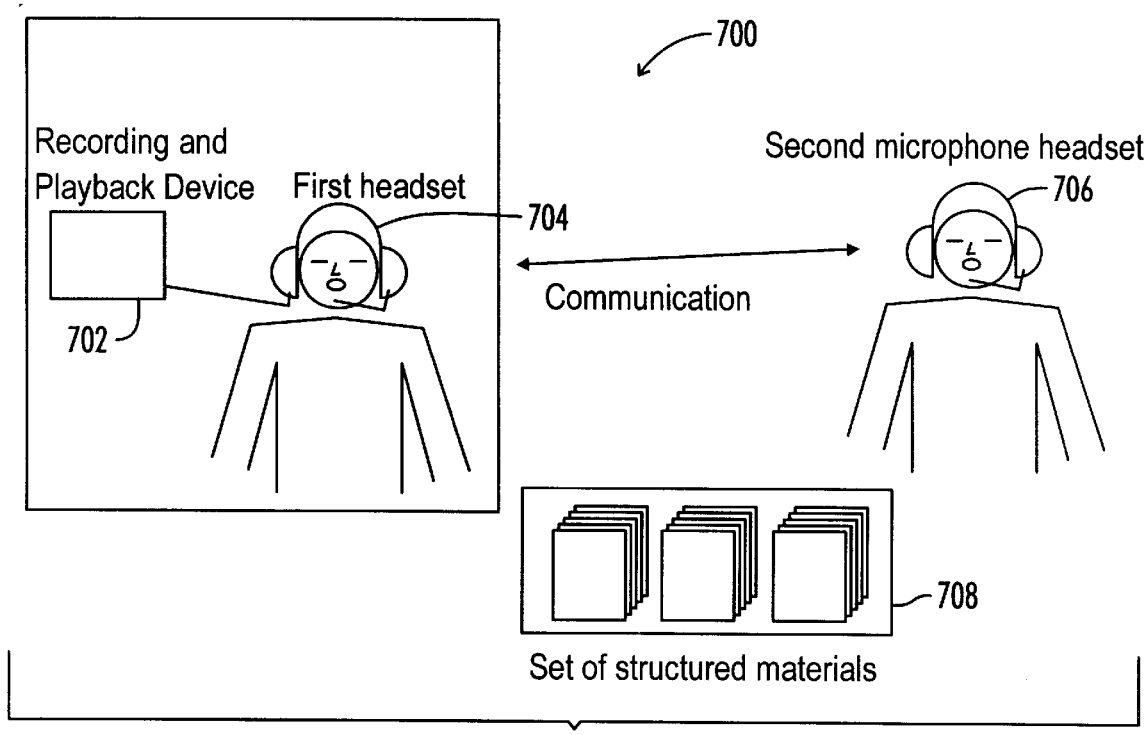
FIG. 7
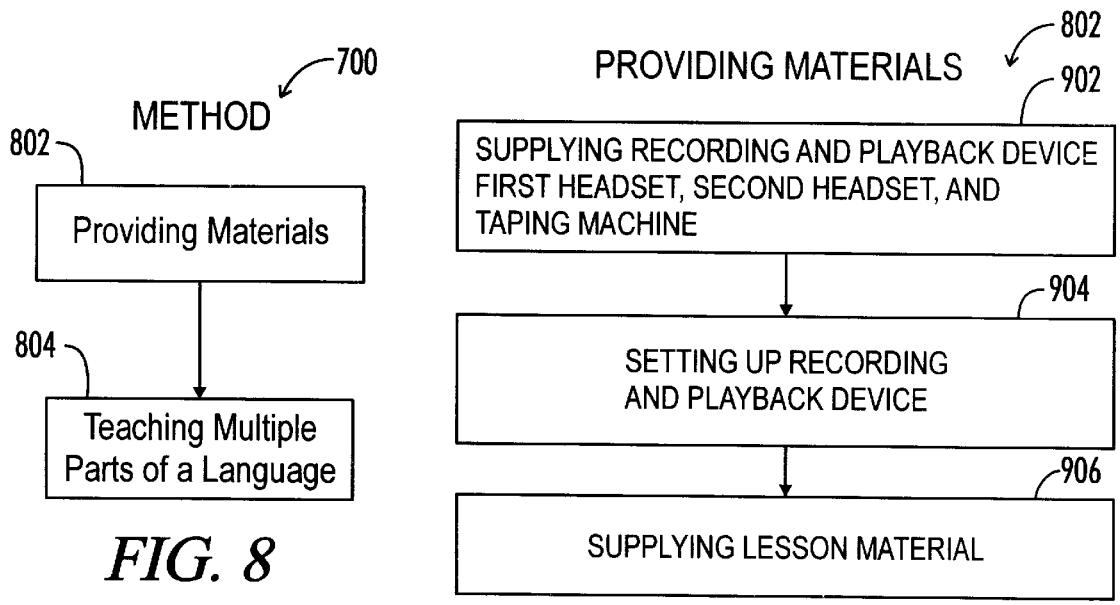
FIG. 8
FIG. 9

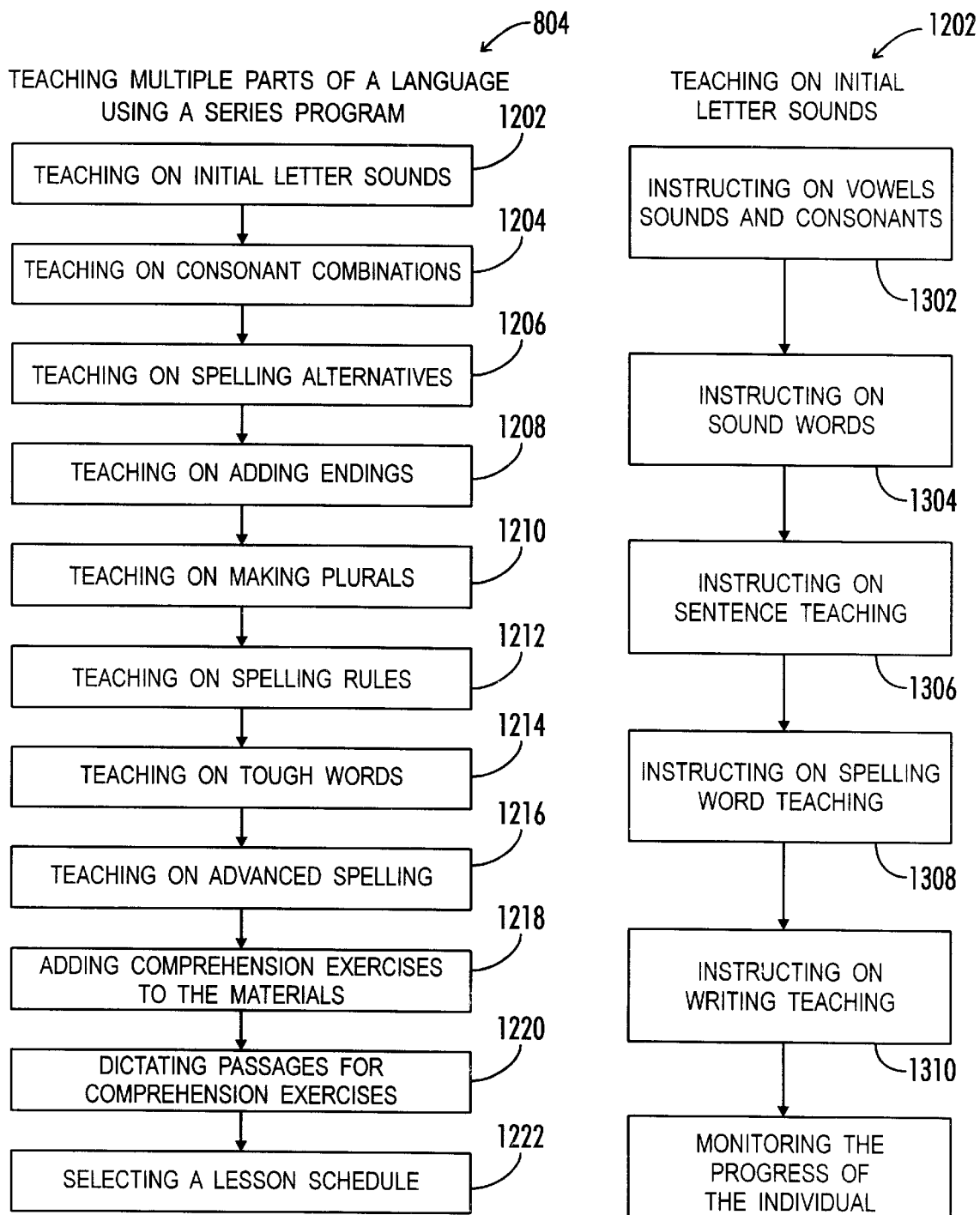

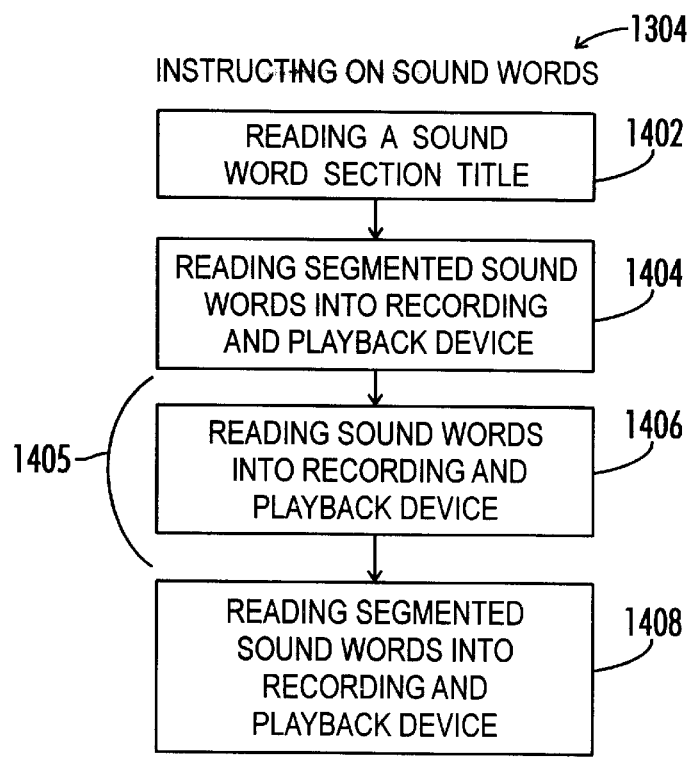
FIG. 14
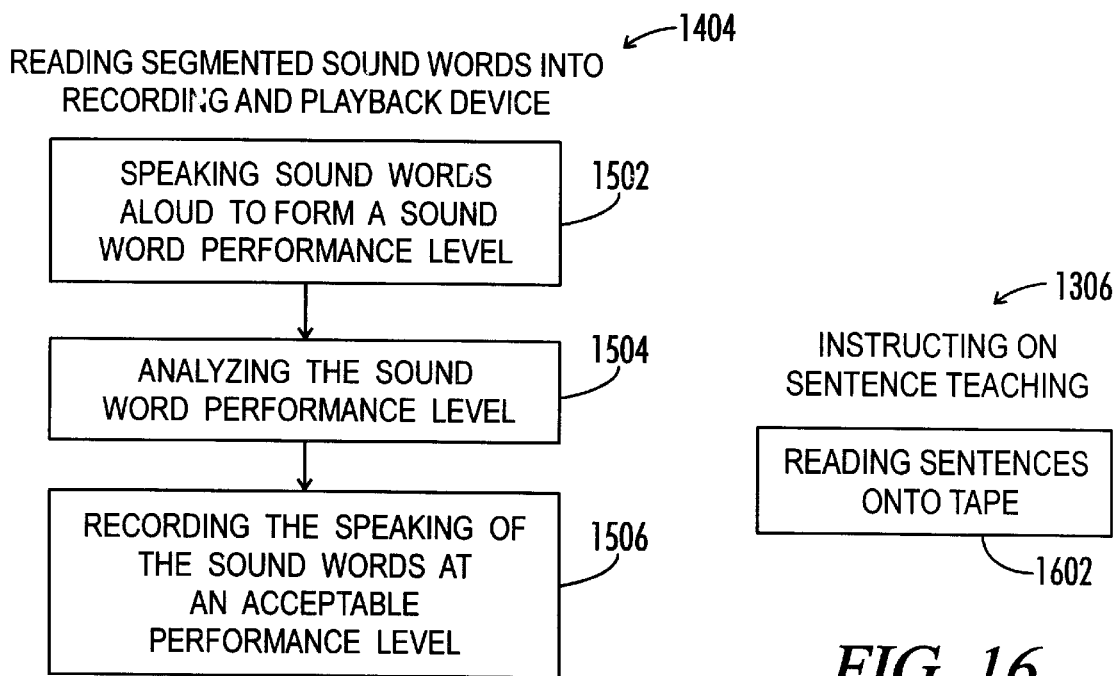
FIG. 15
FIG. 16

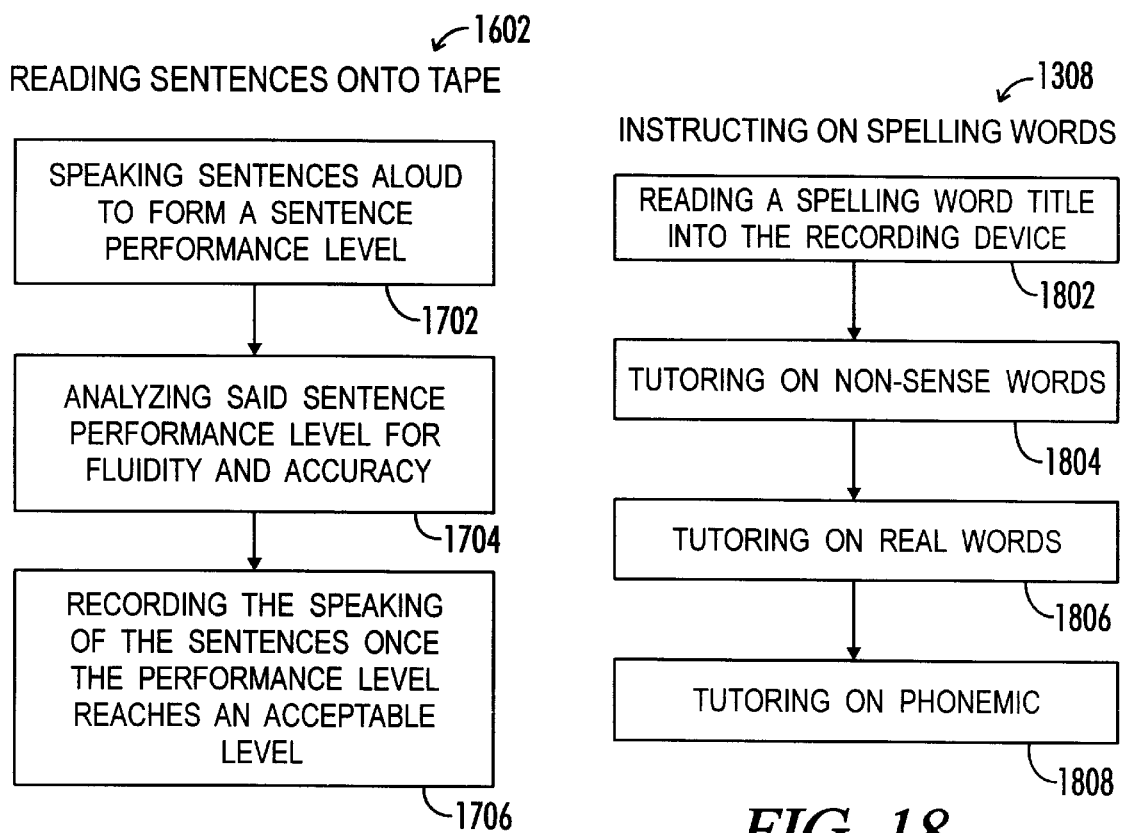
FIG. 17
FIG. 18
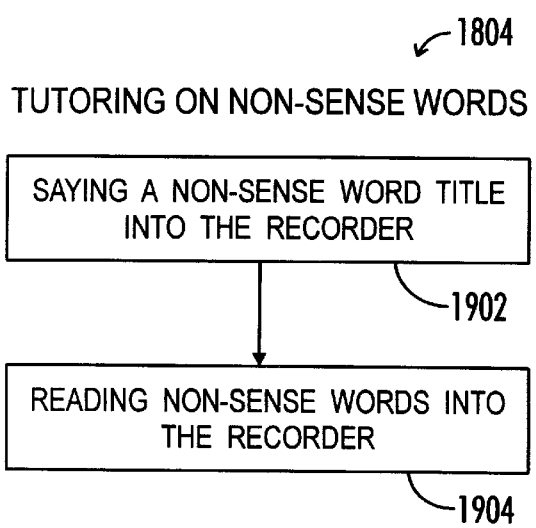
FIG. 19
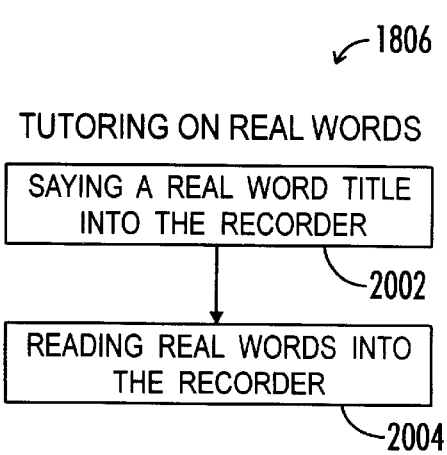
FIG. 20

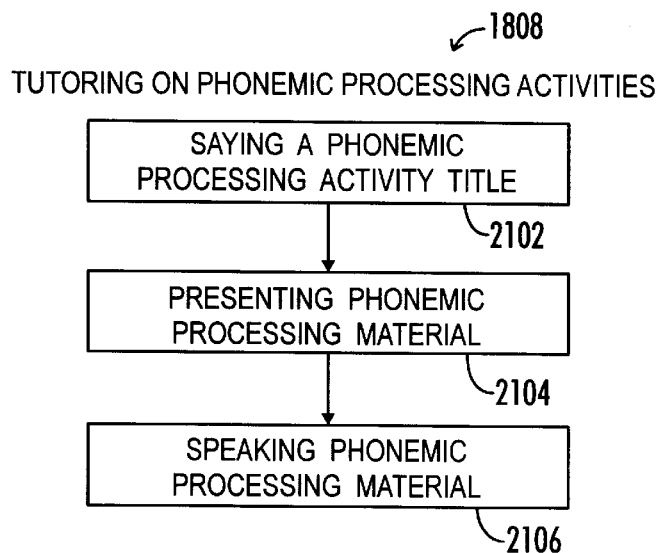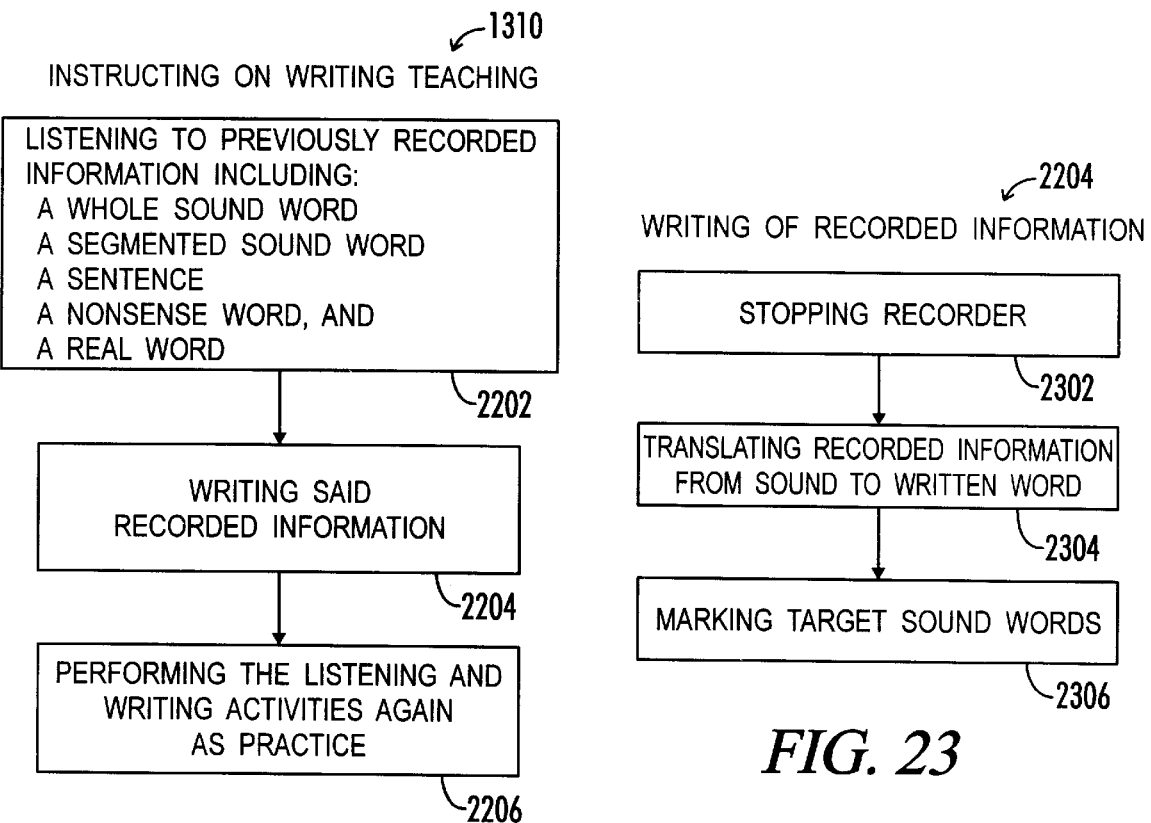

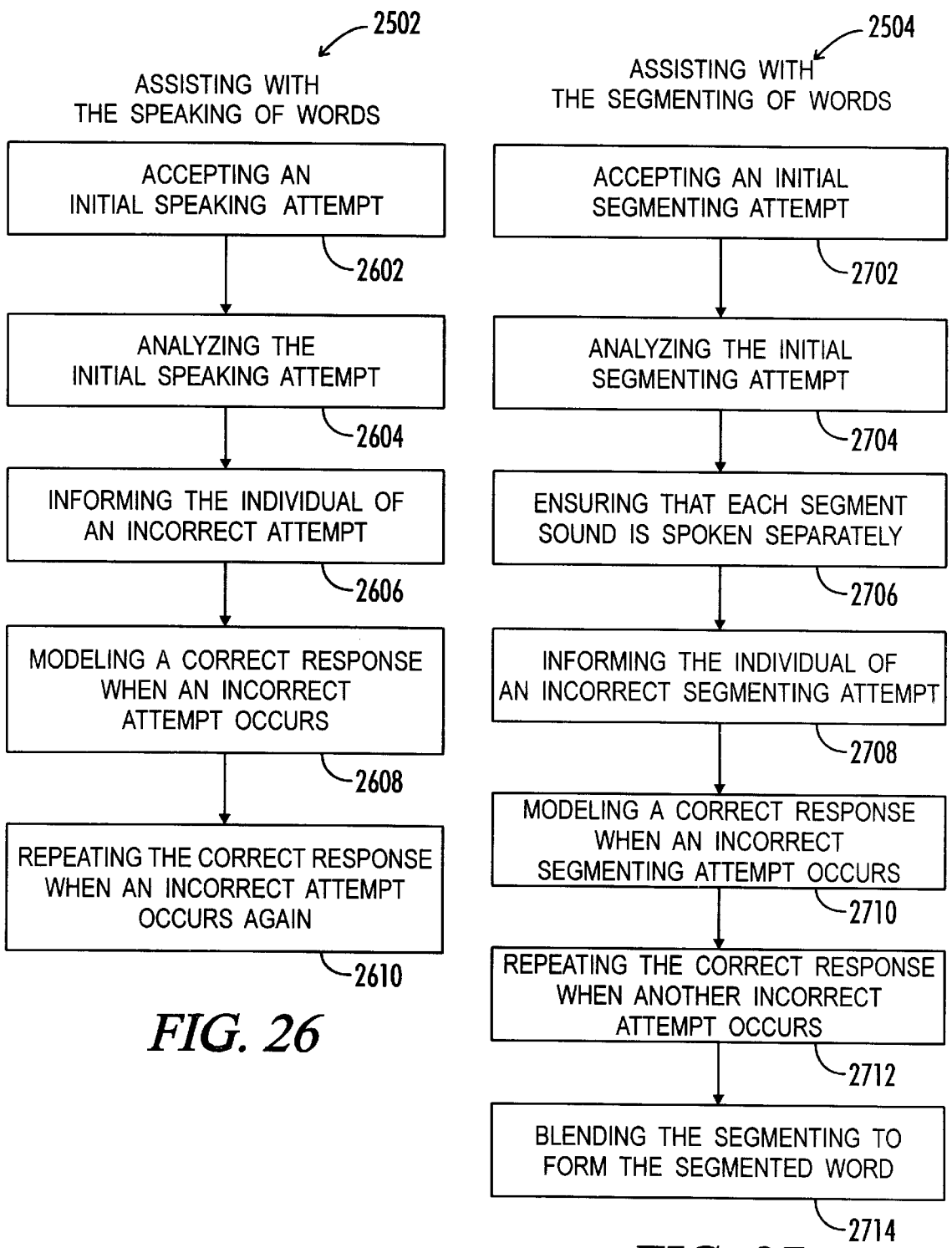

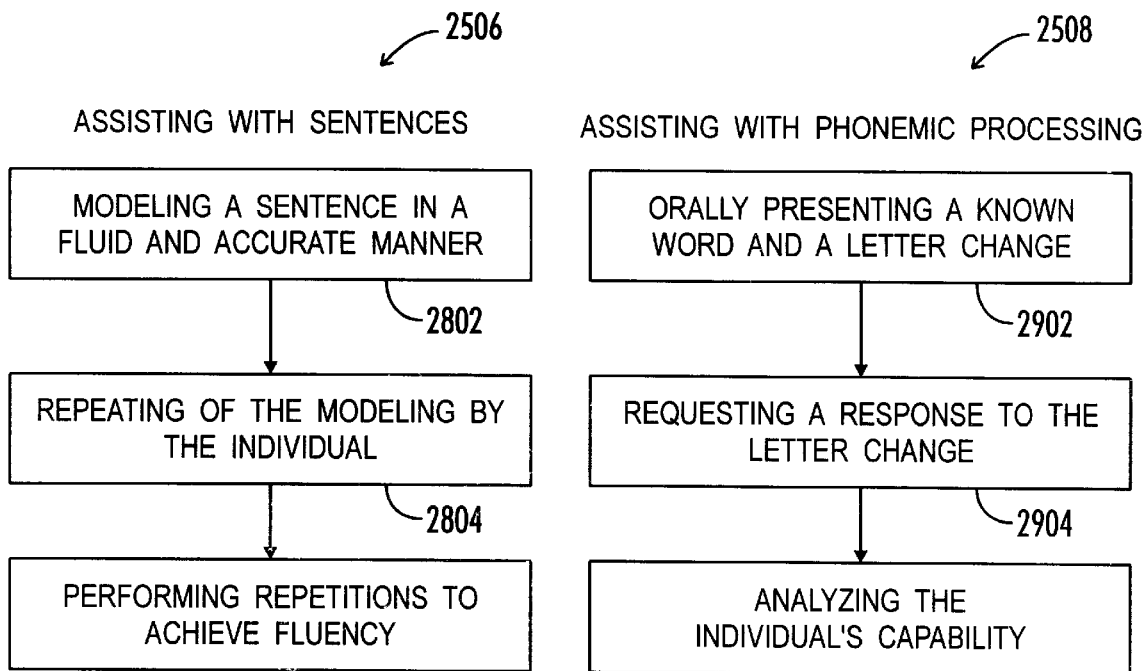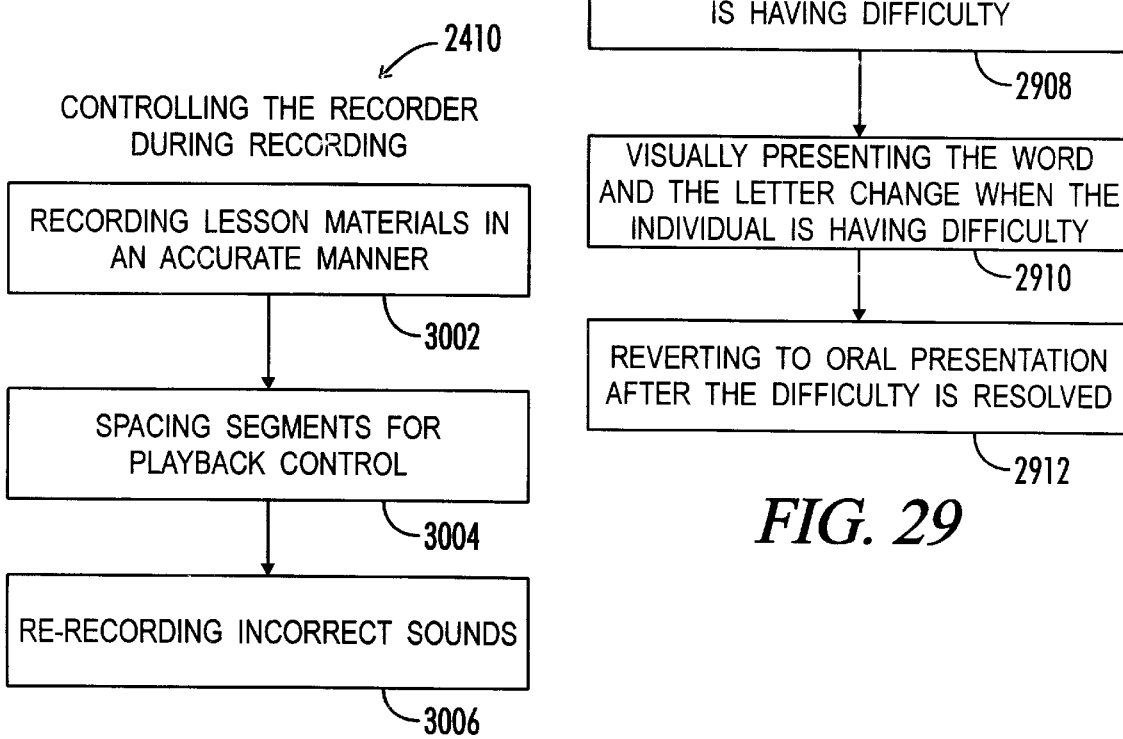

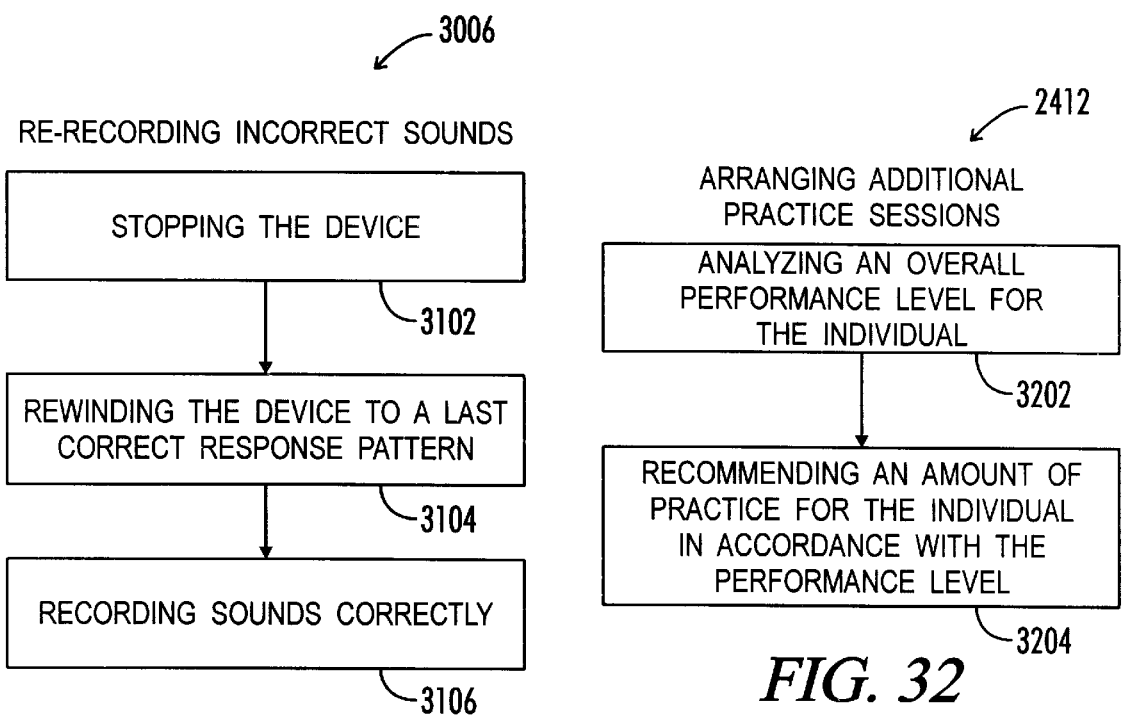
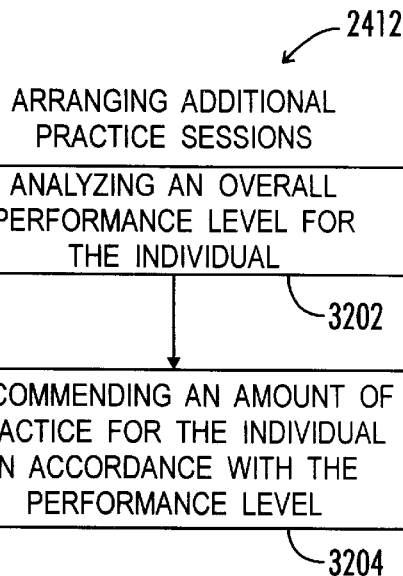
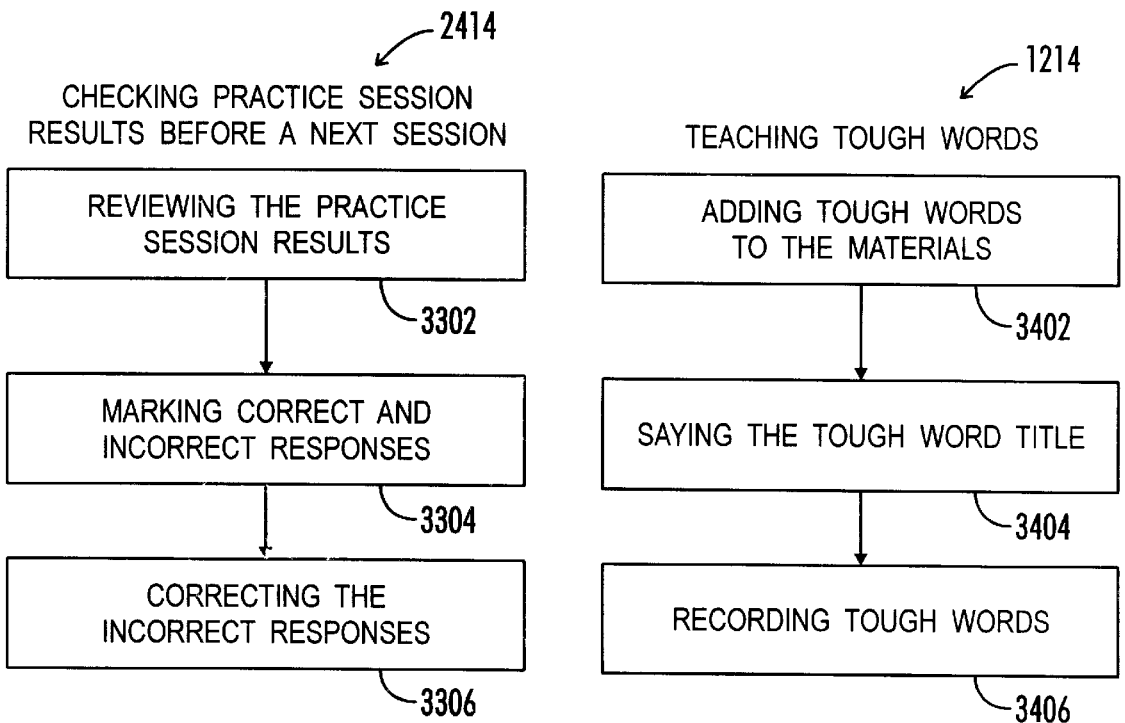

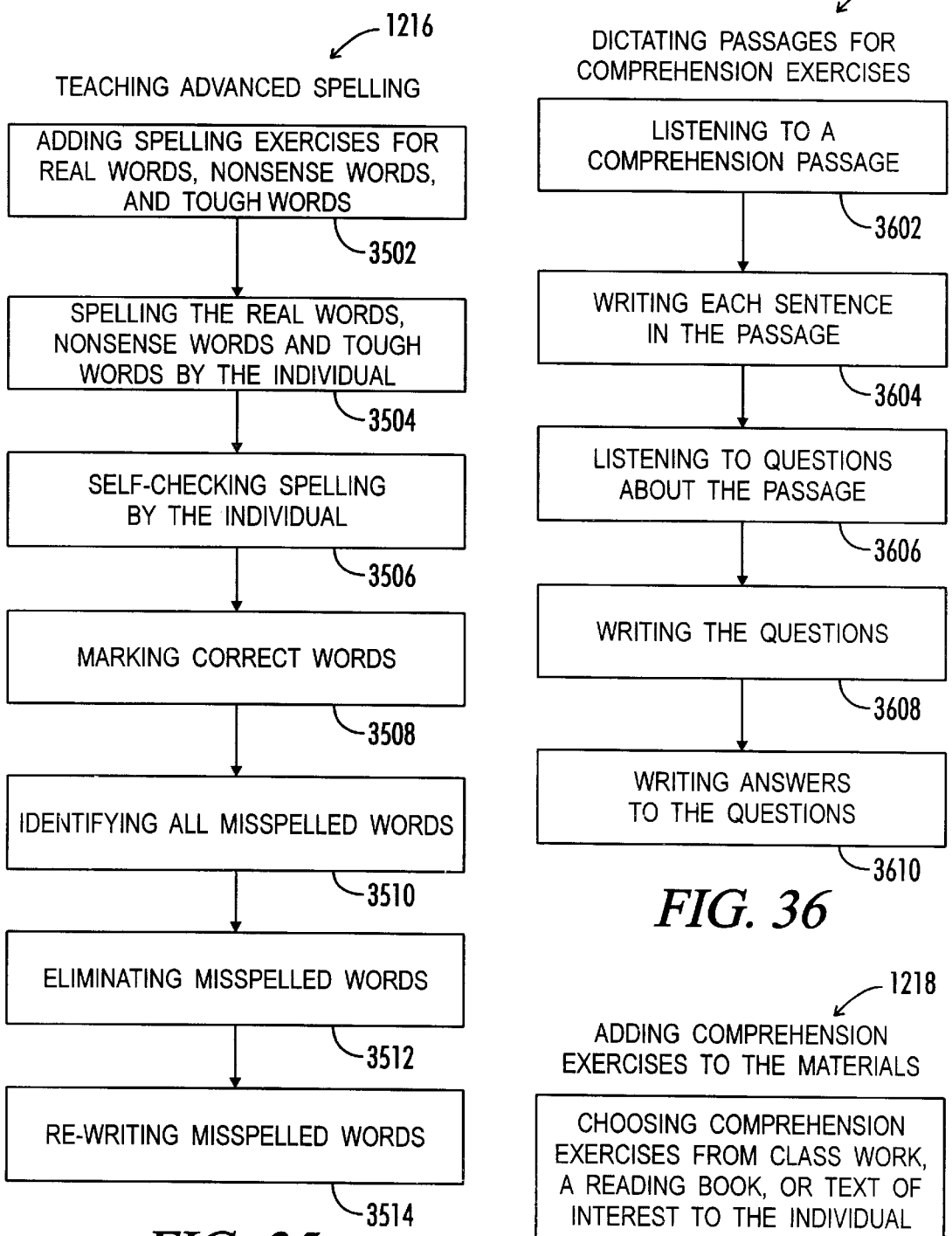

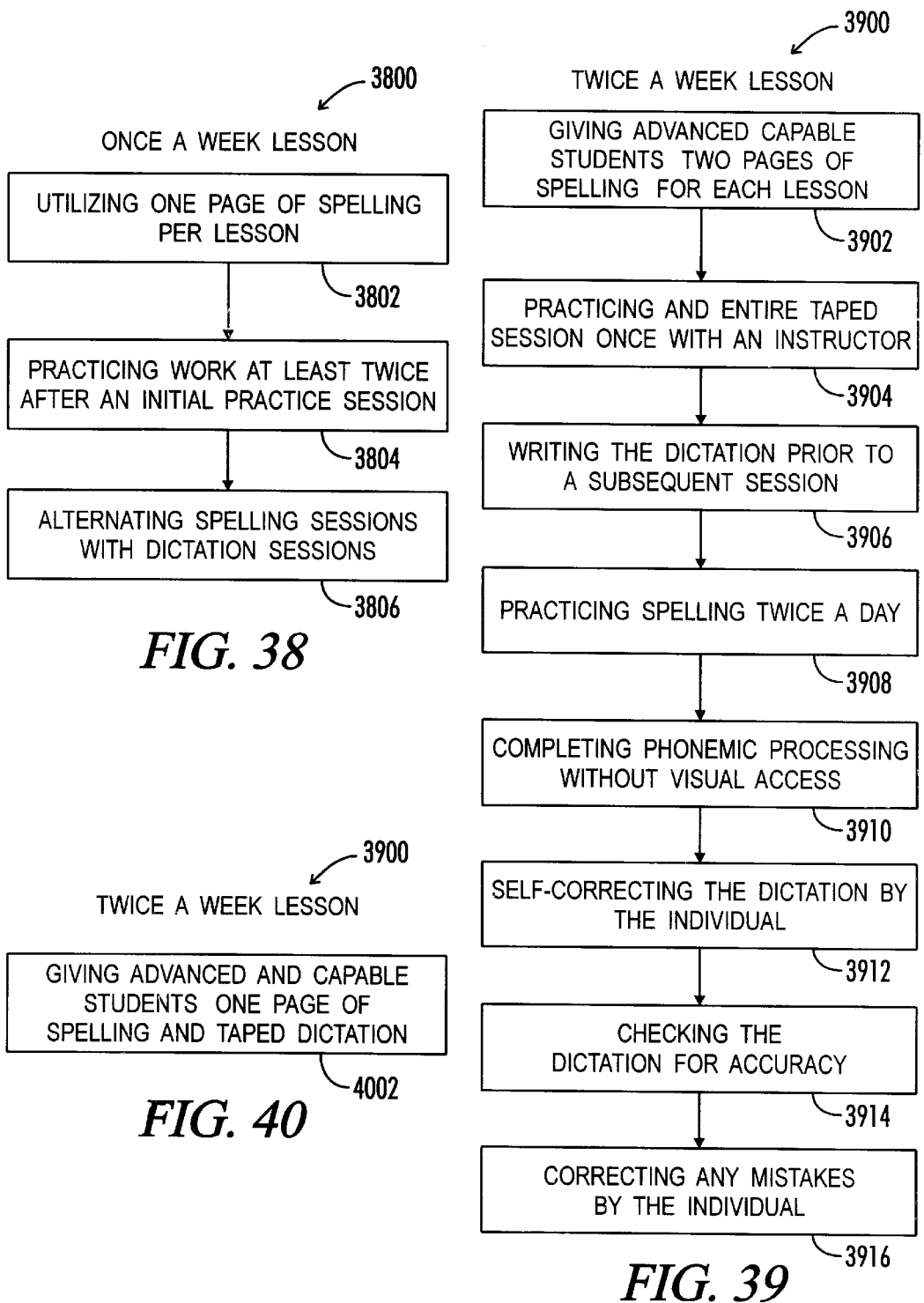

SYSTEM AND METHOD FOR LITERACY DEVELOPMENT

This application claims benefit of co-pending Provisional U.S. patent application Ser. No. 60,148,912 filed Aug. 13, 1999, entitled "Multisensory Method for Teaching" which is hereby incorporated by reference.

COPYRIGHT NOTIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to an integrated method and system that uses multiple sensory materials with a voice recording and playback system. More particularly, this invention pertains to a method and system that uses structured materials and an analogue mono tape recorder with a microphone headset that allows the patient, student, individual, or set of structured materials including schema to improve discrimination of the sound patterns within words.

The development of the ability to process speech sounds takes place at middle ear level during the early childhood years. The critical period for developing the skills for the analysis, discrimination, and categorizing sounds within speech takes place between the ages of six months and three years. Problems in the child's development can cause difficulties in learning to recognize printed materials. These problems may be caused by the various forms of dyslexia, middle ear infections in infancy (Otitis Media), and phonemic processing difficulties.

Dyslexia is an inherent condition, neurological in nature, whereby the individual experiences a difficulty in coding and decoding "spoken speech" to "written speech" and vice versa. "Written speech," also known as print, is "spoken speech" put on paper using an alphabetic and phonemic code. The phonemic code is composed of phonemes, which are the minimal speech sounds. In an alphabetic language, we use letters singly and in combination to represent these minimal speech sounds. The ability to deal with the speech at the phonemic level is necessary in order to acquire proficiency in the coded speech.

Some reading disabled students have difficulties in listening even though their hearing is adequate. These students may have experienced middle ear infections prior to entering school. Otitis Media, a catarrhal condition of the middle ear, subtly degrades the quality and quantity of the information passed by the middle ear to the speech and hearing centers in the developing brain. This is caused by the middle ear attenuating sounds differentially across the spectra of speech sound frequency. This condition has been shown to adversely affect the ability to acquire effective literacy skills and may also affect speech development. Otitis Media in infancy can result in difficulties in discriminating and categorizing the sound patterns within words. This problem with sound patterns can lead to difficulties in literacy development because phonemic processing skills are necessary to deal with an alphabetic phonetic language such as English.

One of the identifying aspects of Attention Deficit Disorder (A.D.D.) is the inability to "internalize" another individual's external speech. The internalization of speech from the individual himself is not a problem in the A.D.D. individual because their behavior and responses are controlled by their internal speech. The difficulty in the learning process is in getting the A.D.D. affected individual to internalize the external speech of another individual. This problem is most frequently encountered when the other individual is trying to teach or exercise control over the A.D.D. affected individual.

A recent study by the Conference Board of Canada states that individuals with high literacy skills will earn a working lifetime average of $500,000 dollars more than people with low literacy skills. People with low literacy skills are eight times more likely to experience long term unemployment. The cost in Canada of low literacy skills has been computed by the same conference board study as $8 Billion Cdn. The figures for the US will most likely be comparable in per capita terms.

Present figures indicate that approximately 35% of third grade students within the Nashville Metropolitan School District fail to acquire appropriate levels of reading skills. US national figures from a recent OECD report indicate that approximately 40% of native born and educated Americans are functionally illiterate. This means that they do not possess sufficient literacy skills to allow them to easily deal with everyday activities that involve literacy. In the less economically advantaged areas this number is probably higher. It is common knowledge that many of those who fall foul of the law have literacy problems as do many of those who find themselves recurrent welfare claimants.

The importance of phonemic processing skills and the ability to discriminate and categorize the sound pattern within words has been well documented in the literature. These skills have a proven relationship to reading disabilities. See Bradley & Bryant (1983); Vellutino & Scanlon (1987); and Wagner & Torgesen, (1987). In addition, these skills are also associated with reading comprehension. See Foorman (1997).

There are many programs that are directed towards the correction of reading disabilities. These programs range from phonic drill programs such as The Writing Road To Reading, Hooked on Phonics, DISTAR and Reading Recovery to the more complex approaches such as the Lindamood ADD program (Auditory Discrimination in Depth) and the Fast For Word Program which uses high end computers and software. The Fast For Word Program was originally designed for use with individuals suffering from severe receptive language disorders and involves high end computers. This program requires the student to attend for two hours per day, and is available mainly through 'licensed therapists'. A scholarly review of this program can be found in Brady (1997). In addition to these programs, a cursory search of the internet will produce a plethora of remedial reading programs based on phonics and other approaches.

Phonic drill programs can be difficult for many reading disabled students. This difficulty is caused because disconnected phonemes are, in essence, meaningless unless they are associated with words. The ability to deal with the individual sound patterns as they appear within words is not a normal aspect of language development. Furthermore, many students with poor reading skills also have difficulty in the areas of attention and concentration. These additional difficulties make this learning activity especially difficult for them. These facts limit the usefulness of drill programs in developing reading in many students.

Furthermore, some of these remedial programs over complicate an already complex situation. These programs can impart information to the student that will have to be unlearned at a later time (e.g. diacritics in the Writing Road To Reading). Other programs introduce unnecessary detail such as learning redundant word or sound families (Hooked on Phonics). These programs have further disadvantages because they require a great deal of time to produce measurable results. The "ADD" program requires a four-hour daily attendance schedule and requires a range of instructors dealing with the various aspects of the program. The teacher/instructor requires a great deal of knowledge of how speech is generated and how the language works at phonemic level. The "ADD" program is effective with a range of students but takes a relatively long time. The Reading Recovery program takes to a year to yield significant results. See Shanhan & Barr (1995). For further information, a useful review of the literature on the effectiveness of many of these remedial programs can be found in Pinnel (1994).

Thirty years of research into reading difficulties shows conclusively that the ability to segment, blend and manipulate the minimal speech sounds within words (phonemes) underpins literacy development. These abilities are independent of measured IQ.

In most cases the identification of significant reading difficulties in students within the average range of general ability can take a year or more. A significant proportion of readers with these disabilities fall within the average range. During the time period before the students have been identified with reading disabilities, the students are becoming increasingly aware of their failures which affects both their self image and their self esteem as learners. These "failing readers" often develop a fear of failure, a fear of learning, and other performance related anxieties which may cause them to acquire a range of 'avoidance' behaviors. These avoidance behaviors are developed to allow them to 'escape' from the situations that signal possible failure. This results in the 'if you don't do it you can't fail it' approach.

The effects of "negative self-image as a learner" and "performance related anxiety on learning" are well documented in the literature. Speilberger (1966, 1978). A slow acting program will only serve to deepen the anticipation of continued failure in many students. Self esteem and self confidence are best built on the basis of real achievement. Thus, a program that works quickly will produce the quickest change in student expectations of success. Therefore, to be really effective, a remedial program should be able to produce improvements quickly so that the student can perceive the increase in their ability to deal with print.

What is needed, then, is an efficient learning technique to assist a range of individuals who are experiencing difficulties in relation to literacy skill development due to the reasons cited above.

SUMMARY OF THE INVENTION

An integrated method and system which uses multiple sensory materials with a voice recording and playback system. The system provides a means for those individuals who have unexpected difficulties in dealing with printed speech to overcome those difficulties. The method and system comprises an analogue mono tape recorder with a microphone headset that allows the student to hear his voice as collected at the microphone and a set of structured materials including schema to improve discrimination of the sound patterns within words. The method and system uses and integrates the sense systems responsible for vision, hearing, speaking and writing simultaneously in a unique multi sensory format. When the student hears his voice in both recording and playback it is perceived by the student to originate within the midline of the head. This midline perception is viewed by the student as an internal perception.

This invention uses a technique including self voice feedback using taping equipment, to assist a range of individuals who are experiencing difficulties in relation to literacy skill development. It includes a training scheme to develop auditory processing skills with respect to speech frequencies, to improve, (1) ability to segment, blend and manipulate the sound patterns (phonemes) within words and (2) associate these with visual representations (letters) of those sounds. The invention improves reading and spelling accuracy and fluency both oral and silent, listening, and a range of other important learning skills.

In accordance with one embodiment of the present invention, an improved apparatus and method are provided which addresses the drawbacks of the prior art devices and in one of its exemplary forms includes a recording and playback device, and a set of structured materials including a schema to improve discrimination of sound patterns.

In yet another example of the present invention, a literacy development method for an individual with a voice is provided which includes providing materials, including a recording and playback device, and teaching multiple parts of a language by a series program.

A further example of the present invention provides for a literacy development method which presents the initial letter sounds, consonant combinations, spelling alternatives, the adding of endings, the making of plurals, and spelling rules.

A still further example of the present invention teaches a literacy development method which includes instructing on sound words, sentences, spelling words, writing, and monitoring the progress of an individual.

Other objects and further scope of the applicability of the present invention will become apparent from the detailed description to follow, taken in conjunction with the accompanying drawings.

BRIEF DESCRIPTION OF THE DRAWINGS

FIG. 1 is a sample lesson plan for the "a" sound.

FIG. 3 is a chart of student results from a test of the program.

FIG. 4 is a chart of student results from a test of the program.

FIG. 5 is a chart of student results from a test of the program.

FIG. 6 is a chart of student results from a test of the program.

FIG. 7 is a schematic representation of the provided communication materials.

FIG. 8 is a flow chart of the method of the present invention.

FIG. 9 is a flow chart of the step of providing materials.

FIG. 12 is a flow chart of the step of teaching multiple parts of a language using a series program.

FIG. 13 is a flow chart of the step of teaching on initial letter sounds.

FIG. 14 is a flow chart of the step of instructing on sound words.

FIG. 15 is a flow chart of the step of reading segmented sound words into the recording and playback device.

FIG. 16 is a flow chart of the step of instructing on sentence teaching.

FIG. 17 is a flow chart of the step of reading sentences onto tape.

FIG. 18 is a flow chart of the step of instructing on spelling words.

FIG. 19 is a flow chart of the step of tutoring on non-sense words.

FIG. 20 is a flow chart of the step of tutoring on real words.

FIG. 21 is a flow chart of the step of tutoring on phonemic processing.

FIG. 22 is a flow chart of the step of instructing on writing teaching.

FIG. 23 is a flow chart of the step of writing recorded information.

FIG. 26 is a flow chart of the step of assisting with the speaking of words.

FIG. 27 is a flow chart of the step of assisting with the segmenting of words.

FIG. 28 is a flow chart of the step of assisting with sentences.

FIG. 29 is a flow chart of the step of assisting with phonemic processing.

FIG. 30 is a flow chart of the step of controlling the recorder during recording.

FIG. 31 is a flow chart of the step of re-recording incorrect sounds.

FIG. 32 is a flow chart of the step of arranging additional practice sessions.

FIG. 33 is a flow chart of the step of checking practice session results before a nest session.

FIG. 34 is a flow chart of the step of teaching tough words.

FIG. 35 is a flow chart of the step of teaching advanced spelling.

FIG. 36 is a flow chart of the step of dictating passages for comprehension exercises.

FIG. 37 is a flow chart of the step of adding comprehension exercises to the materials.

FIG. 38 is a flow chart of the step of once a week lessons.

FIG. 39 is a flow chart of the step of twice week lesions.

FIG. 40 is a flow chart of the step of an additional element of twice a week lessons.

DESCRIPTION OF THE PREFERRED EMBODIMENTS

Figure 2:
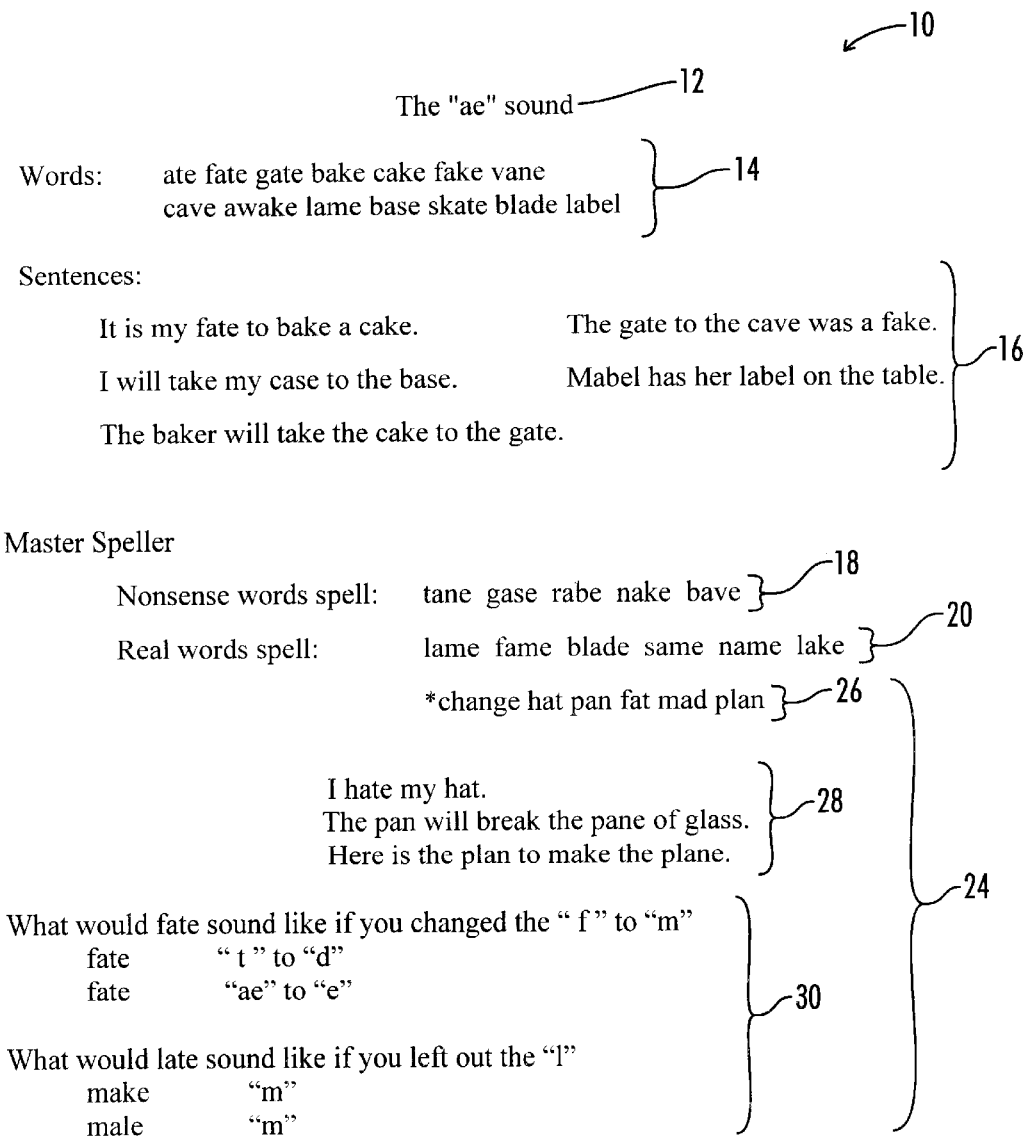
FIG. 2 is a sample lesson plan for the "ae" sound.
Figure 10:
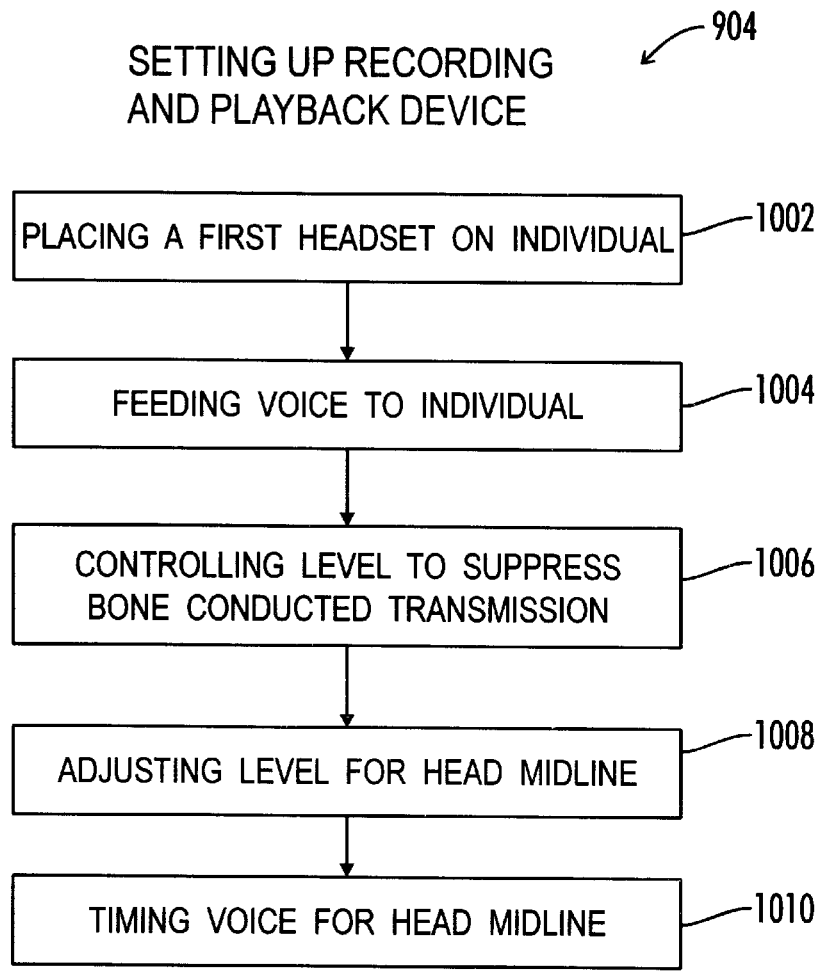
FIG. 10 is a flow chart of the step of setting up the recording and playback device
Figure 11:
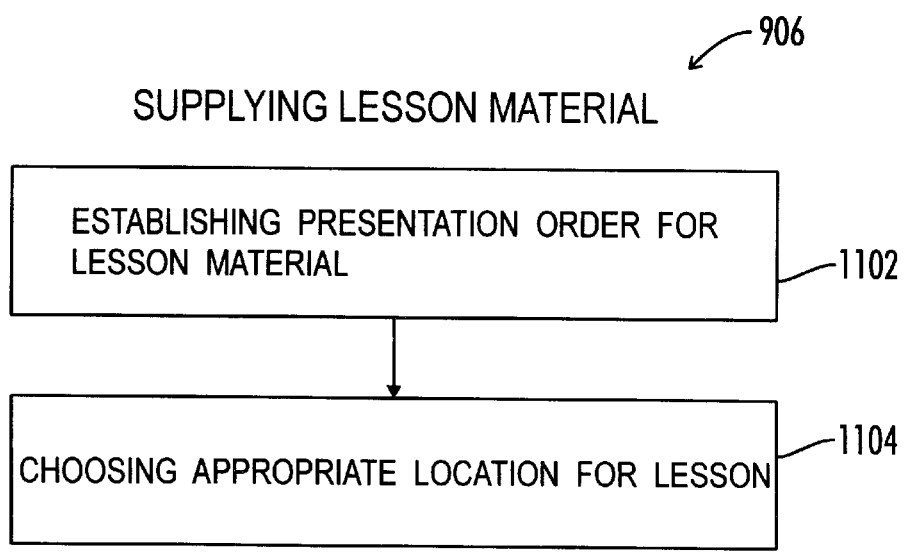
FIG. 11 is a flow chart of the step of supplying lesson material.
Figures 24, 25:
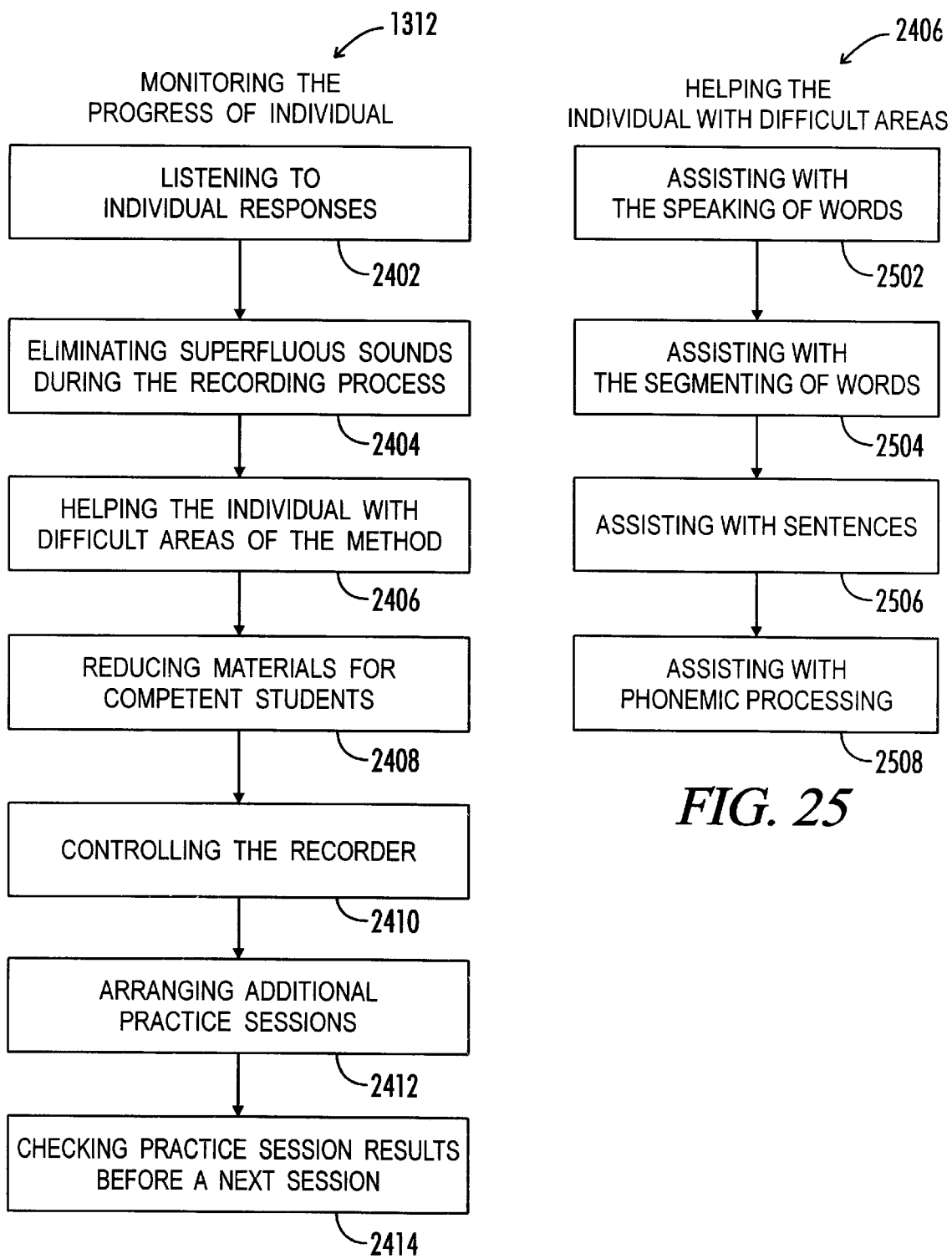
FIG. 24 is a flow chart of the step of monitoring the progress of the individual.
FIG. 25 is a flow chart of the step of helping the individual with difficult areas.

As shown in FIGS. 1 through 40, the multisensory method 700 for teaching bridges the gap between learning preference and the achievement of recognition and phonemic skills by using a self-voice feedback strategy, a multisensory technique which uses the student's own voice to ensure sensory-appropriate presentations of the eidetic and phonemic properties of a written and spoken alphabetically structured language. In writing we are depicting the spoken and heard language in visual terms. The spoken language comes before the written.

An overview of the present invention may be seen by reviewing FIGS. 8 through 40. As shown by these figures, a literacy development method. 700 is taught for an individual with a voice. The literacy development method 700 includes the steps of providing communication materials 802 and teaching multiple parts of a language 804.

The step of providing communication materials includes supplying 902 a recording and playback device, a first microphone headset, a second microphone headset, and a taping machine for recording lessons. This process continues by setting up 904 said recording and playback device by placing 1002 the first microphone headset on said individual so said individual can hear said voice from said first microphone headset, feeding 1004 said voice to said individual at a level and time, controlling 1006 said level to suppress a bone conducted transmission of said voice, adjusting 1008 said level so that said voice in head in a head midline, and timing 1010 said voice to be heard at said head midline. The third step then teaches supplying lesson material 906 including establishing 1102 a presentation order for said lesson materials to increase effectiveness of said lesson materials, and choosing 1104 an appropriate location.

The step of teaching multiple parts of a language 804 by a series program by using the second microphone headset to communicate with the individual includes: teaching including presenting initial letter sounds 1202, consonant combinations 1204, spelling alternatives 1206, adding endings 1208, making plurals 1210, spelling rules 1212, teaching tough words 1214, teaching advanced spelling 1216, adding comprehension exercises 1218 to the lesson materials, dictating passages for comprehension exercises 1220, and selecting a lesson schedule 1222.

Presenting the initial letter sounds 1202 includes directing lessons towards vowel sounds and consonants 1302, instructing on sound words 1304, instructing on sentence teaching 1306, instructing on spelling word teaching 1308, instructing on writing teaching 1310, and monitoring the progress of the individual 1312.

The instructing on sound words 1304 includes reading a sound title of a sound word section 1402, reading sound words into the recording and playback device 1406, and segmenting words by sound 1405. A further improvement may include segmenting words by sound occurring both before 1404 and after 1408 the reading of the sound words The reading sound words into the recording and playback device 1404 includes speaking the sound words aloud to form a sound word performance level 1502, analyzing the sound word performance level 1504 and, recording the speaking of the sound words once the performance level reaches acceptable parameters 1506.

The instructing on sentence teaching 1306 includes reading the sentences onto tape 1602 including speaking the sentences aloud to form a sentence performance level 1702, analyzing the sentence performance level for fluidity and accuracy 1704, and recording the speaking of the sentences once the performance level reaches acceptable parameters 1706.

The instructing on spelling words teaching 1308 includes reading a spelling word title onto the recording and playback device 1802, tutoring on non-sense words 1804; tutoring on real words 1806, and tutoring on phonemic processing activities 1808.

The tutoring on non-sense words 1804 includes saying a non-sense word title into the recording and playback device 1902, and reading the non-sense words into the device 1904.

The tutoring on real words 1806 includes saying a real word title into the device 2002, and reading the real words into the device 2004. The tutoring on phonemic processing activities 1808 includes saying a phonemic processing activity title 2102, presenting phonemic processing material as part of the lesson material 2104, and speaking the phonemic processing material 2106.

The instructing on writing teaching 1310 includes listening to previously recorded information including a whole sound word 2202, a segmented sound word, a sentence, a nonsense word, and a real word, writing the recorded information 2204, and performing the listening and writing activities again as practice 2206.

The writing of the recorded information 2204 includes stopping the recording and playback device 2302, translating the recorded information from sound to written words 2304, and marking target sound words 2306.

The monitoring the progress of the individual 1312 includes listening to individual responses 2402, eliminating superfluous sounds 2404, helping the individual with areas of the method where the individual is having difficulty 2406, reducing the lesson materials for competent students 2408, controlling the recorder during recording 2410, arranging additional practice sessions 2412, and checking practice session results before a next session 2414.

The helping the individual with areas of the method where the individual is having difficulty 2406 includes assisting with the speaking of words 2502, assisting with the segmenting of words 2504, assisting with sentences 2506, and assisting with phonemic processing 2508.

The assisting with the speaking of words 2502 includes accepting an initial speaking attempt 2602, analyzing the initial speaking attempt 2604, informing the individual of an incorrect attempt 2606, modeling a correct response when an incorrect attempt occurs 2608; and repeating of the correct response when an incorrect attempt occurs 2610.

The assisting with the segmenting of words 2504 includes accepting an initial segmenting attempt 2702, analyzing the initial segmenting attempt 2704, analyzing the initial segmenting attempt to ensure that each segment sound is spoken separately 2706, informing the individual of an incorrect segmenting attempt 2708, modeling a correct response when an incorrect segmenting attempt occurs 2710, repeating of the correct response when an incorrect segmenting attempt occurs 2712, and blending the segmenting to form the segmented word 2714.

The assisting with sentences 2506 includes modeling a sentence in a fluid and accurate manner 2802, repeating of the modeling by the individual 2804, and performing repetitions to achieve fluency 2806.

The assisting with phonemic processing 2508 includes orally presenting a known word and a letter change 2902, requesting a response to the letter change 2904, analyzing the individual's capability 2906, identifying when the individual is having difficulty 2908, visually presenting the word and the letter change when the individual is having difficulty, modeling a correct response when the individual is having difficulty, repeating of the modeling by the individual when the individual is having difficulty 2910, and reverting to oral presentation after the difficulty is resolved 2912.

The controlling the recorder during recording 2410 includes recording lesson materials in an accurate manner 3002, spacing segments for playback control 3004, and re-recording incorrect sounds 3006.

The re-recording incorrect sounds 3006 includes stopping the device 3102, rewinding the device to a last correct response pattern 3104, and recording the sounds correctly 3106.

The arranging additional practice sessions 2412 includes analyzing an overall performance level for the individual 3202, and recommending an amount of practice for the individual in accordance with the performance level 3204.

The checking practice session results before a next session 2414 includes review the practice session results 3302, marking correct and incorrect responses 3304, and correcting the incorrect responses 3306.

The teaching tough words 1214 includes adding toughwords to the lesson materials 3402, saying a tough word title 3404, and recording tough words 3406.

The teaching advanced spelling 1216 includes adding spelling exercises for real words, non-sense words, and tough words 3502, spelling the real words, non-sense words, and tough words by the individual 3504, self-checking spelling by the individual 3506, marking correct words 3508, identifying all misspelled words 3510, eliminating misspelled words 3512, and re-writing misspelled words 3514.

The dictating passages for comprehension exercises 1220 includes listening to a comprehension passage one sentence at a time 3602, writing each sentence in the passage 3604, listening to questions about the passage 3606, writing the questions 3608, and writing answers to the questions 3610.

The adding of comprehension exercises 1218 includes comprehension exercises are chosen from class work, a reading book, or text of interest to the individual 3702.

The method may be further enhanced when it is taught by a lesson schedule selected form a lesson schedule group including a once a week lesson 1222 and a twice a week lesson 3900. The once-a-week lesson 3800 includes utilizing one page of spelling per lesson 3802, practicing work at least twice after an initial practice session 3804, and alternating spelling sessions with dictation sessions 3806. The twice-a-week lesson 3900 includes giving advanced capable students two pages of spelling for each lesson 3902, practicing an entire taped session once with a instructor 3904, writing the dictation prior to a subsequent session 3906, practicing spelling twice a day 3908, completing phonemic processing without visual access 3910, self-correcting the dictation by the individual 3912, checking the dictation for accuracy 3914, and correcting any mistakes by the individual 3916. The twice-a-week lesson may also include giving advanced and capable students one page of spelling and taped dictation 4002.

In this manner, one can see the overall method of the present invention. The following discussion will explain the benefits and advantages of this method and outline an individual lesson plan for use with the method.

Reading difficulties are overcome by: (1) capitalizing on an individual's receptivity to and interest in his or her own voice to (2) coach the sounding—that is make connections between the eidetic or visual stimuli and oral/auditory stimuli using cognitive phonemic processing systems.

This new reading development system is based on a neurological model derived from research findings in the areas of speech production and recognition including voice feedback through hearing auditory processing, dyslexia, learning styles and learning dynamics. The system is built on unique and innovative curriculum structures and technology that uses the student's own voice as the mechanism by which the program is delivered. The program imparts to the student the forty-three to forty-four basic sounds of the English language, as well known in the prior art, which are taped and given to the student to study in a controlled multi-sensory way. It is the student's own voice that the student learns from, he/she is in effect teaching themselves in the voice that they think in.

There are 44 essential sounds which comprise the English language. These sounds are well known and documented in the prior art. Each of these can be represented by the "picture" formed by alphabetic letters. For example, the letter "A" is presented as a picture of the sound 'a'. Guided by a certified tutor—and perhaps prompted by modeling behavior—a student may record a self-voice study guide for the sounds comprising a language. This guide, properly recorded as "bonal" sound, ensures an instructional medium which is not only of great interest to a student—but is, sensory-appropriate—and error-free as well.

The multisensory method 700 for teaching combines the unique and innovative self-voice feedback technique and structured sequential cumulative multisensory materials 708. This speeds up the learning process by an incredible amount as "learning blocks" are overcome. In just five hours of treatment reading can increase by one full grade or more.

The students learn by: Looking, Saying, Listening, and Writing. Learning styles are neurologically based and thus, have to do with the way our brains are "wired". Some people learn best by looking, some by listening, some by physically doing, some do best by combining these. Each individual pattern of learning abilities will contain strengths and weaknesses. These weaknesses and strengths have nothing to do with IQ or ability to learn. The combination of self-voice echo and multi sensory materials fits every learning style and leads to fast and lasting increases in reading, spelling and other learning skills. Direct instruction techniques are used, practice to mastery is built in to the program. It is not another boring phonics drill program, textual reading and comprehension activities are a part of every session and an integral part of the program.

The multisensory method 700 for teaching is a one on one program based on a "cognitive therapy" approach that involves a technique known as 'self voice echo'. It was discovered quite by accident that hearing impaired students much preferred the sound of their own voice and that learning and retention was much faster when their "self voice" was used as the instructional medium. A similar effect was found in normal hearing children. self-voice echo involves recording the individual's voice in a form as close to the bone conducted voice as possible.

The learning materials are structured, sequential, cumulative and multi sensory and deal primarily with the sound structure of the English language. The combination of the "self voice feedback" and the structure and content of the learning materials take into account and allow for all learning styles, strengths and weaknesses. Some individuals learn best visually, some auditorially, some kinesthetically, these differences are neurologically based and any inability in any one area is not related to intelligence or innate ability to learn. Research has clearly shown that reading ability is unrelated to intelligence. In addition to rapidly improving word recognition skills and spelling the program also improves: listening skills; auditory discrimination of the sound pattern within words; sound pattern categorization skills; short term auditory recall; reading comprehension; reading speed; reading fluency; attention span; concentration; self confidence. The program works with the sub skills of reading and spelling and as it is delivered in a relatively error and distraction free environment allows learning to take place at a rapid rate. The Program can use reading material from any culture or subject and can be used to teach literacy skills in any language.

Each program session is split into two separate activities, one involves textual reading, dictation and comprehension exercises, the other is working with the sound structure and phonetic rules of English. All the lesson material is recorded in the student's own voice using a mono system. The student's assignment is to listen to the tapes and write down all that is recorded. The student is in effect taking dictation from his own internal voice much in the same way that we all do when we write. The practice sessions can take place in the classroom (using a standard cassette player and headphones) or anywhere else, including home, as long as the student has access to a cassette player and a set of headphones (e.g. Walkman).

The method 700 and system comprises an analogue mono tape recorder 702 with a microphone headset 704 that allows the student to hear his voice as collected at the microphone and a set of structured materials 708 including schema to improve discrimination of the sound patterns within words. The method 700 and system uses and integrates the sense systems responsible for vision, hearing, speaking and writing simultaneously in a unique multi sensory format. When the student hears his voice in both recording and playback it is perceived by the student to originate within the midline of the head, that is internally.

This invention uses a technique including self voice feedback using analogue taping equipment 702 to assist a range of individuals who are experiencing difficulties in relation to literacy skill development due to the reasons cited above. It includes training schema to develop auditory processing skills with respect to speech frequencies, to improve, (1) ability to segment, blend and manipulate the sound patterns (phonemes) within words and (2) associate these with visual representations (letters) of those sounds. Thirty years of research into reading difficulties shows conclusively that the ability to segment, blend and manipulate the minimal speech sounds within words (phonemes) underpins literacy development. These abilities are independent of measured IQ. The invention improves reading and spelling accuracy and fluency both oral and silent, listening and a range of other important learning skills.

In the method 700 and system described below it is the individual's own voice that is the mechanism for building improved phonemic processing skills. This method 700 uses the same neural speech feedback loop that controls spoken speech. When we listen to someone's speech and later think about the content of that speech we think about in our own voice, not the voice of the speaker. This requires one to translate the speaker's voice into our own voice in order to process the information. This is a major step in any learning process that utilizes speech as the delivery system for the knowledge being imparted. By using self voice feedback this fundamental and important step in the learning process is bypassed and learning is speeded up by a significant amount. The self voice feedback mechanism is effective in dealing with students with attention difficulties as well as literacy difficulties. The system described below is effective with ADD individuals simply because all the information is delivered in the students own voice inside their own head in a distraction free format.

The use of the student's own voice as the teaching medium has many positive aspects. Almost every student likes the sound of their own voice when it is recorded on the taping system that is used in the present program. The importance of the self voice in other areas such as attitude and behavior change has been documented by Helmstetter (1986).

In the following text the following conventions are used to simplify the explanation of session procedures. Any letters enclosed in single quotes thus ' ' are speech sounds and not letter names. Words and letter names are designated by double quotes "", which is the text spoken by the student. For example 'a' represents the speech sound at the beginning of the word "at." This sound is sometimes known the short vowel sound for the letter "a." Thus, the term 'ai' indicates that the letters make one sound. The term 'ai' indicates the sound of the long vowel for the letter "a." This is shown by the first sound in the word "aim."

The materials, which are structured and cumulative, cover all the speech sounds in the English language. The material will also cover spelling alternatives for the English language sounds. Spelling alternatives are different ways of making similar sounds by using different letter combinations. For example: one can represent the so called "long a" sound by either putting a "silent e" at the end of the word or syllable as in "fate"; using the combination 'ai' as in "claim"; the combination 'ay' as in "play"; the combination 'ei' as in "vein"; and the combination 'eigh' as in "eight"; etc.

The materials start with initial letter sounds and then move on to the short vowels, consonants, long vowels, consonant combinations, spelling alternatives, adding endings, making plurals, and spelling rules. Sample lesson materials will be discussed in further detail herein.

The taping system feeds the individual's voice back to him at a level that suppresses the bone conducted voice. The bone conducted voice is the one that we hear when we speak. This bone conducted voice is different in tonality etc. from the air conducted voice. The air conducted voice is the voice that others hear when we speak.

To generate speech we need to have instant feedback, via our hearing, of the sounds made by the mouth. This feedback is usually obtained through the bone conducted voice. When the student is recording the spoken voice using our taping system, the individual's speech generating mechanism is working from the speech feedback supplied to him through the headphones. This is in place of the bone conducted voice as normally used. Thus, the student's speech generation is working from the external voice and not the internal voice.

Speech is very difficult to generate in the absence of instantaneous acoustic feedback from the voice. For example, you might have experienced a telephone call in which you hear your own voice coming back at you in an echo shortly after you have spoken the words. This can be very disconcerting and can make it hard to speak clearly.

Any significant delay in speech feedback results in the voice not being recognized as the individual's own voice. As an example, when a person first hears their voice on tape, they do not think the voice sounds like themselves. This is corrected by the timing and the volume of the self voice feedback in the taping system. This correction results in the voice being recognized by the brain as being the individual's. This changes the input to the speech generating mechanism and the voice is heard in the midline of the head. This results in the external voice being used in the midline which is where we perceive ourselves when we speak and/or think.

The Taping Technique

The individual puts on the microphone headset 704 as does the therapist 706. This allows the therapist to communicate directly with the student through the headphones 706. It is the therapist's responsibility to closely monitor the student's responses. This ensures that the lesson materials are accurately recorded in the proper sequence by the student. Because the system utilizes speech sounds, the therapist needs to ensure that the student does not add any superfluous sounds during the recording process. All of the taping involves the student hearing his or her own voice as picked up by the microphone headset 704. The student's voice is heard in the midline of the head as the speech is produced by the student. The therapist's voice is not taped, and the student works exclusively from a taping of the student's own voice.

1. Sessions One Through Nine

In the first nine sessions words are read on to tape one at a time and then spelled by letter sound. The word is spoken by the student and taped e.g. "cat." The word is then spelled by letter sound, not letter name. This spelling is called segmenting. Thus "cat" becomes 'c' 'a' 't', this process is continued until all the words supplied have been thus recorded. The accompanying sentences are then read by the student on to the tape in a fluent and accurate manner.

Finally, the student reads and spells a set of nonsense words in order to acquire the ability to manipulate the sounds within words and to check that the sound pattern has been acquired in a way that obviates any interference from visual recognition input. If the student has any difficulty with any aspect or part of the session materials then the therapist models the correct responses for the student. The student will then commit the correct responses to tape. Errors are not taped. Thus, if an item is incorrect, the tape is stopped and rewound to the last correct response pattern. The item is then recorded correctly.

The sequence of saying the word in its entirety then spelling it out by sound can be altered if circumstances so require it. As an example, if a student has severe difficulties in phonemic processing, say aphasia or "vowel deafness," then the segmenting could take place first. This would allow the student to sound spell the word. Thus, the word "cat" would be formed by its sounds, "c"-"a"-"t." Then the word would be spoken, "cat," and then the word would be spelled out again by sound "c"-"a"-"t."

a. Sample of A Typical Session

The therapist sets up the tape recorder and materials in an appropriate location for this process. The therapist controls the recorder during the taping procedure. Each step of the process will now be explained using the sample lesson plan 10 shown in FIG. 1 of the drawings.

Step One: The title 12 is read onto tape by the student. As shown in FIG. 1, the student would read the title "The 'A' Sound As In 'AT'" 12.

Step Two: The student reads the sound words 14 onto the tape. Thus, the therapist records the sound words 14, e.g. "at", 'a,' 't,' "bat," 'b,' 'a,' 't,' and so on until the last sound word 14 in the list. If the student experiences any difficulties, then the therapist will model the sound word 14 and/or the sounds that it contains. The therapist will then ask the student to repeat the modeling. Once it has become certain that the student can speak the sound word 14 correctly, the student is allowed to put the sound words 14 on tape.

Step Three: The student then speaks the word sentences 16. The student reads the sentences 16 one at a time. These sentences 16 are taped in a correct and fluid style of speech. If the student experiences difficulty, then the therapist will assist with the word or words of the sentences 16. Once the student can read the sentences 16 correctly, they are recorded onto the tape.

Step Four: The student speaks the phrase "Nonsense words, spell" and then reads each individual nonsense word 18. Once again, if the student finds this difficult then the student may sound out the letters and blends the sounds into the non-sense word 18. The therapist can assist by modeling the process. Once the student has correctly pronounced the non-sense word 18 it is recorded.

Step Five: The student speaks the phrase "real words, spell" and the real words 20 in the list are recorded on tape. These real words 20 will later be listened to and written out by the student as a check to ensure that the session material has been absorbed by the student.

Step Six: The student performs the phonemic processing activities 24. For example, the student is asked orally to say what the word "cat" would sound like if we changed the "c" to "f." This activity is not recorded.

Step Seven: The student replays the tape, listens to himself say each whole sound word 14, and then listens to himself spell the sound word 14 by sound. The student then stops or pauses the tape machine to write the sound word 14 down on paper. Each sound word 14 is executed in the same way. The student then listens to each sentence 16 individually, and the tape machine is paused and the student writes down the sentence 16. The nonsense words 18 and the real words 20 are then listened to and written down. In addition, this activity can be performed again at a later time for additional practice to further enhance retention.

2. Sessions Ten and On

From session ten the sound words 14 are read onto tape, segmented into sounds and then spelled by letter name. The sentences 16 are dictated to tape as above.

a. Sample of a Typical Session

Following FIG. 2 of the drawings, a typical session will now be described.

Step One: The title 12 is read onto tape. As shown in FIG. 2 of the drawings, the title is "The 'AE' Sound As In "ATE.""

Step Two: The sound word 14 is said in its entirety, broken into its constituent speech sounds and then spelled by letter name. For example, the sound word 14 "ate" would follow the outline: "ate"-'ae'-'t'-"a"-"t"-"e." Each sound word 14 in the list is treated in the same way.

Step Three: The student then says the word "sentences" and records the sentences 16 one at a time.

Step Four: The student records the phrase "nonsense words, spell." The student then reads each individual nonsense word 18. If this is difficult, then the student sounds the letters out and blends the sounds into the nonsense word 18 correctly. If need be, the therapist can assist by modeling the process. Once the student has correctly pronounced the nonsense word 18 it is recorded.

Step Five: The student says "real words, spell" and records the real words 20 one at a time on tape. These real words 20 will later be listened to and then written out by the student as a check that the session material has been absorbed.

Step Six: The next task is to perform the phonemic processing activities 24. For example the student will be asked orally to say what the word fate would sound like if we did not say the "f". This activity is not recorded.

Step Seven: The student's task is then to replay the tape. The student listens to himself say each whole sound word 14, segment the sound word 14 into its constituent sounds, and spell the sound word 14 by letter name. The student then stops or pauses the tape machine to write the sound word 14 on paper. Each sound word 14 is covered in the same way. The student then listens to each sentence 16 individually, and the tape machine is then paused while the sentence 16 is written down. The nonsense words 18 follow the sentences and are also listened to and written down. Finally, the real words 20 are listened to and written down. This entire activity 10 can be performed again later as additional practice to further enhance retention.

3. Sessions Fourteen and On

From session 14, dictation passages (not shown) are added to the previous lesson plans described in the early sessions. A typical session would include the sound words 14, sentences 16, nonsense words 18, and real words 20 of the previous sessions. In addition, dictation passages with comprehension exercises are read onto tape. The student's task is then to follow the same sequence as in sessions ten and on and then listen to the passage. This is performed one sentence at a time so that the student may write down each sentence. At the end of the tape, the student will listen to questions, write down the questions, and then write down the answers.

The student's responses are checked at the end of each session, and additional practice sessions are arranged for the student. The initial taping session takes approximately twenty minutes. The additional practice sessions, where the student simply repeats the work covered in the initial taping sessions, takes approximately ten minutes on a twice a day basis. This "practice" or "homework" is checked before the next session is started.

Additional work can be given in the form of extra reading material. This material is put on tape by the student. Examples of additional work include class work or a preferred reading book or text of interest to the student.

Additional uses for the aforesaid method 700 are quite common. The method 700 can also be used for second language learning. This is because almost all alphabetic languages follow the same structure. The method 700 can be used in ESL to improve pronunciation and literacy skills in English. Furthermore, the self-voice feedback has uses in speech pathology and in other areas of behavior change.

Reading Tutor Notes.

This system has been designed to allow the therapist to successfully work with the widest range of students. This sequence of sessions has been found to be the most effective procedure. This procedure moves from the simple to the complex in a way that reflects the sound structure of the English language. Sessions should not be skipped, irrespective of age or educational background. There are many apparently competent readers who have missed out on some of the most basic aspects of dealing with a writing system based on an alphabet. These individuals quite often are inherent "guessers" who use their abundant "native wit" to comprehend what they read, they often have to read a passage more than once to abstract the meaning.

All students must go through the first five vowel sounds. However, the therapist could perhaps cut down the number of words and sentences for the most competent students. The effect of the first five sessions is to inculcate the idea that letters are, in effect, visual representations of speech sounds. This teaches the basis of all alphabetically coded languages. Letters do not "make" sounds, they represent the sounds in speech.

Each section in the "Beginning Vowel Sounds" section of the program ('a' to 'e' sounds) follows the following format. The student records the title/target sound, each sound word 14 is said and then spelled by letter sound, not letter name. Many students will append vowel sounds onto the ends of consonants for example they will say "tuh" for 't', "cuh" for 'c'. This needs to be actively discouraged as it will confuse the student and mitigate against the rapid learning of decoding skills.

Speech sounds need to be exact and precise to allow the logic that underlies the orthographic system to be effectively learned. It should be ensured that the student says each sound separately. For example 'c'-'a'-'t' not 'ca'-'t' or 'c'-'at.' Handling student problems is further explained below in association with segmenting—problems and solutions. The instructor should leave a short space on the tape between each word and its spelling so that the student has time to control the tape during playback. The instructor should encourage the student to use the "Pause" button as it allows ample time for the student to write out the individual words and sentences. The system is designed to allow the student to rewind the tape and listen to any particular word or sentence.

The sentences 16 are read one at a time and put onto tape. If the student's reading is not fluent, the instructor should allow several repetitions of the sentence 16 so that fluency can be achieved. Furthermore, any words that pose difficulties should be sounded out. If necessary, the instructor can supply the word rather than let the student flounder. The instructor may also need to model a fluent reading of the sentence 16 for the student to put the sentence on tape. This will be required if it is difficult for the student to achieve fluency with a few repetitions. The *"Nonsense Words" 18, "Real Words" 20 and **"Tough Words" 22 are to be put onto tape and the student then has to spell them as a part of the practice sessions.

For the "Nonsense Words" 18 the routine is as follows. See if the student can read the nonsense words 18 easily, if this is the case then the instructor does not need to record any of the words. However, if the student finds this difficult, then the instructor will need to get the student to sound the letters out and then blend them into words. The instructor will record the nonsense words 18 but not the sounding out.

The student should sound out and read a good selection of the nonsense words 18. Then the student can go back to the beginning of the list and follow this script;—the student says "master speller, nonsense words, spell" and a selection of the nonsense words 18 are put on tape for the student to spell as a part of the practice session. If the student finds dealing with the nonsense words 18 easy, then the instructor can select just a few words. If it is difficult for the student, then the instructor should select more nonsense words 18 to provide plenty of practice for the student.

For "Real Words" the student should say "real words, spell" and then read the real words 20 onto tape for the student to spell as part of the practice sessions. The instructor can vary the number of real words 20 for the level of the student. Thus, the instructor does not need to record all of the nonsense 18 or real words 20. Thus, the weaker student should perform more nonsense words 18 than the strong student.

The next section "Tough words" 22 is covered in this way. The tough word 22 is presented to the student and the student is asked to spell the tough word 22. If the student can spell the tough word 22, then the instructor will move on to the next tough word 22. I the student cannot spell the tough word 22, then the title of the section is put on tape and the student reads the tough word 22 onto the tape. The student should read the tough words 22 and spells them by letter name. Next, the student's task is to listen to each tough word 22 being said/spelled and then write it out.

The phonemic processing activities 24 are next. For example, FIG. 1 shows this section with the example: "What would bat sound like if you changed the 'b' to 'f'. Ideally this material should be presented orally. If the student finds the oral presentation difficult to follow, then the instructor should allow visual access to the words. Once the student has the idea of the method 700, the instructor should revert to oral presentation. Additional types of phonemic activities 24 are shown as phonemic words 26, phonemic sentences 28, and phonemic questions 30. These items are treated like their equivalents in the other activities.

The last task involves the student going back to the sentences 16 and underlining or circling all the words that contain the target sound. At the end of the practice session the student should be given the printed material that has been taped so that he/she can check and self correct any words that are misspelled. Each word correctly written should be marked correct and words in error should be erased or crossed out and then rewritten in their entirety. The instructor should not allow the student to fix words but should insist on completely rewriting the misspelled words.

The system is designed to flow in order. Work from the previous sessions should be checked and any corrections carried out by the student before commencing the new session. Homework practice sessions should be insisted upon as they are a fundamental part of the process and are conducive to rapid progress. The student should follow the same layout as shown in FIGS. 1 and 2. The instructor should encourage the students to leave a line of space between every line of writing. This is important, because the feedback to the student helps to encourage clear handwriting.

Problems and Solutions

Some students will experience difficulty in segmenting a word into its constituent sounds. The ability to separate a word into its most basic constituent sounds, also known as phonemes, is not a normal part of language development. Some individuals will pick up this skill very quickly, some will have great difficulty at first. Some individuals will break a three sound word such as cat into either 'c'-'at' or 'ca'-'t'. Thus, these individuals produce two sounds rather than the three. This is understandable as combining a consonant sound with a vowel sound is a part of early speech development. If a student produces either of the attempts above, the instructor should accept the initial attempt but inform the student that 'ca' is made up of two sounds and ask the student if they can say what the sound are. If the student cannot split out the sounds, then the instructor should model the word for them and ask the student to repeat the model several times in verbatim. The instructor should then ask what is the first sound in 'ca,' and what is the last sound. If this is still difficult for the student, then the instructor should model the process. Finally, for the students that still have difficulty in completing the task, the instructor should model each word by saying it aloud and then asking the student to say the word. The instructor should tape the student's response if it is correct. The instructor should then model the segmenting and again ask the student to repeat the model. Once again, this should be taped if it is correct. If the student cannot deal with sequence of the sounds, then the instructor may record each sound separately. This should be done to minimize the delay between the sounds on the finished recording.

If the student experiences difficulties in blending the sounds into words, then the instructor should model the blending process. This may be done by combining the initial consonant with the vowel. For example, 'ca'-'t.' In the alternative, the instructor may use 'c'-'at.' The instructor may need to model the process several times for students that find this difficult. This is especially true with respect to the "nonsense" words.

If the student experiences difficulties in dealing with the "phonemic processing" activities, then the instructor should allow visual access to the words. These activities are best carried out using only oral presentation, however many poor readers will find this difficult. For these students allow visual access to the words and problems set. Once the student has the basic idea of the system, the instructor may try restricting the visual access and concentrate on the oral presentation. The oral presentation is the most beneficial method. In some circumstances the instructor may need to model the correct response. If the response is modeled, then the instructor should Immediately ask the student to repeat the task.

Although handwriting is not a part of this program the visual feedback should be as clear as possible. Thus, the instructor should encourage the clearest possible writing. Teaching the student to leave a line of space between each line of writing will help. The instructor should the student's work before the student leaves the session. The instructor should check all of the student's homework, and any misspelled words should be written out correctly at least three times before starting the new session. The student should not be allowed to "fix" misspelled words by correcting the misspelled part. The instructor should insist that the misspelled word be erased or crossed out and rewritten in its entirety. This will help reinforce the correct spelling in the student's repertoire.

Long Vowels (Silent e Rule) Reading Tutor Notes

Another example of a lesson is directed towards the long vowels. A long vowel sound is represented by the vowel plus an "e" to indicate the sound is not a "short" vowel sound. Any letter or letters in single quotes indicates a speech sound, not the letter name.

The format for each section is as follows. All "Rules" are to be put on tape and written out by the student as dictation at least once. The instructor may need to allow visual access to the rule for the student to work from. The title target sound is put on tape. For example, "The 'ae' sound." Each word is said, sounded and spelled by letter name. After the target words have been completed the sentences are read on to tape one at a time. The student's task is to listen to each sentence and then write it down. In most sections there are "nonsense tales" that are to be recorded including the questions. The student's task is to listen to the sentences one at a time, write down the sentence, listen to each question, write down the question, and then write the answer. The student can stop the tape as often as required and can replay any or all of the sentences as required.

If the instructor is working with the student on a daily basis then only one page of spelling should be done per lesson. The instructor should ensure that the work is practiced at least twice after the practice session. The instructor may alternate the spelling sessions with dictation sessions. These dictation sessions are acceptable up to approximately 40 ins. of tape using material of interest to the student, a classroom reader, or a text book at an appropriate level for the student's reading ability. The student should redo the entire dictation work at least once subsequent to the taping and practice session.

If the instructor is seeing the student twice a week, the instructor should give advanced and capable students two pages of "spelling" or one page of spelling and 30 to 40 ins. of taped dictation. The dictation material can be from any material of the student's choosing or classroom reading material from any subject. The student should practice the entire taped session once with the instructor. Then, for additional practice, the student should write the dictation down again at least once prior to the next session. Furthermore, the "spelling" should be practiced twice a day for each day subsequent to the taping session.

In the phonemic processing section the instructor should try to get the student to complete the work without visual access. The instructor should provide the questions orally and keep the target words hidden or otherwise unavailable. If the student is having difficulty then the instructor can allow visual access to the words until the difficulty is resolved. The instructor may then revert to oral presentation.

When the student has completed the taping practice session the instructor should provide the printed material to the student for self correction of their work. The instructor should check their homework for accuracy and have the student make any corrections.

Experimental Investigation

An experimental investigation was used in a remediation study to provide information of system efficiency. This system and method 700 was verified by a short term study involving the delivery of a remedial reading program to two groups of students identified by their respective schools as experiencing significant difficulties in acquiring appropriate levels of literacy skills. The remedial program used the present technique whereby the student learned from his/her own voice using a range of structured, cumulative multiple sensory materials. Results from both schools are shown in FIGS. 3, 4, 5, and 6 and a brief discussion and overview of the area of literacy development is presented. The study reports on student outcomes in what was essentially a tutor training program. Most of the lessons were delivered by the trainee tutors as a part of the training program. In school A, the trainee tutors were both teachers and educational assistants. In school B the trainees were three classroom teachers.

The program was delivered in ten consecutive daily sessions of approximately 10 to 15 minutes each. This is not the recommended format for the most effective delivery of this program. The most effective (and the least intrusive in terms of classroom organization and time spent away from the classroom by the student) is for the student to be seen twice a week for about fifteen to thirty minutes. The time needed to deliver a single session will, inter alia, be affected by factors intrinsic to the student. The number of sessions required will be a combination of those intrinsic factors and how much ground the student has to cover to arrive at relative competency in literacy skills. A major component of the program is the practice sessions that are carried out by the student between taping sessions either in school or at home.

Ideally each practice session would be repeated at least six times between taping sessions. Due to time constraints this was not possible in either school and it is highly likely that the increases in word recognition skills as shown in post test results would have been even more positive for some if not all of the students.

The two schools were quite different in the profiles of their student intake. School A was situated in a rural/suburban area where poverty is comparatively rare, school B although situated in a relatively affluent area takes minority students from the poorer and more deprived sections of Metropolitan Nashville. School B is a nationally accredited "school of excellence".

The students seemed to enjoy the activity and were all co-operative and easy to work with.

The sound structure of language needs to be taught in conjunction with the other reading processes for the maximum effect.

The system was tested by the following method. In school A, ten students were placed in a no treatment control group and the other ten in the experimental treatment group. In school B eight were placed in the control group and eight in the experimental group. All thirty six students were assessed pre and post program using the following tests: Boder test of Reading Spelling Patterns (N. American norm referenced and diagnostic test); The Bradley Assessment of Reading Difficulties (tests ability to discriminate and categorize sound patterns within words); and informal test of phonemic processing skills. The pre and post test results are given in FIGS. 3–6. For the sake of brevity only the Boder Reading Test was given for the post test results section.

Most students were given ten consecutive sessions on the program on a daily basis, a few students received less on account of absence. The sessions were in two parts, taping and initial practice. The taping sessions took on average ten minutes to complete, the practice sessions another ten. Many students completed the entire session in fifteen minutes after the first few sessions. Each student covered all the so called "short" and "long" vowels and consonant blends such as th, sh etc.

The taping component of the sessions involved the trainee tutor taping the material in the student's voice, all recordings were to be error free and the student's rendition of the word or sound has to be reasonably clear and accurate so that the model he/she has to work with is a correct as possible. In a typical taping session the student has to read each word orally and if he/she cannot do this it is read for them by the instructor, a process known as modeling. The sentences are also taped with help provided as required.

The student's practice assignment was to listen to the tape and (1) write down the words as they are heard (2) write down the sentences. In this way oral, auditory and kinesthetic activities are happening concurrently thereby encouraging rapid and permanent learning. Auditory discrimination skills, segmenting, blending and auditory processing skills are being developed quickly and easily. This work is given as repeat practice in the form of homework or classwork. In the full program all the vowel sounds are covered, as are the consonant blends, etc. This could take twenty to forty or more sessions depending on the individual student, in this study only the first fifteen sound patterns in Book One were covered by those students who attended all ten sessions. Individual students varied in how often the practice was completed at home.

The results indicate that the overwhelming majority of students made remarkable progress in improving their word recognition skills, the comments from the teachers clearly showed that self esteem and self confidence were raised significantly. The inter student difference in rate of progress could be accounted for by a number of factors, motivation, number of practices carried out, general ability, degree of the student's initial difficulty in relation to phonemic processing skills, amount of discrepancy between age and attainment etc. These factors will not be discussed in any detail. An informal analysis of results suggests that the students who made the biggest gains were those who completed additional practice sessions at home.

A substantial proportion of the students treated in both schools had been identified as having learning difficulties, and several were described as having Attention Deficit Disorder. The nature of the program and the way in which the sessions are delivered makes it effective with students who have attention problems. One of the problems with Attention Deficit Disorder students is that they have difficulty in reliably listening to and internalizing any voice except their own. This is delivered in the student's own voice in a distraction free format and as a consequence is highly successful at improving learning speed and long term retention in students who have difficulties in attending.

As shown by this experiment, there is little doubt that the use of the self voice feedback in conjunction with properly structured multi sensory materials can significantly improve basic literacy skills in a wide range of students. The sessions were relatively brief, ten to fifteen minutes of tutor time being sufficient in most of the cases. This makes it very economical in terms of teacher/aide time. In a resource room setting a substantial number of students could be helped without incurring excessive additional costs. The success of the program derives from the fact that it works by developing the fundamental sub skills, collectively known as phonemic processing skills. These skills underpin attainment in reading and spelling.

The program described above is simply a tool for dealing with those students who have failed to acquire appropriate levels of literacy skills using present classroom approaches. Conceptually the approach is very simple, however despite this it is a very powerful technique that works at deep levels in the hearing, speech, vision and kinesthetic sensory systems. The tape provides a permanent record of the lesson that the pupil can refer to at any time. The student is required to practice the lesson at least twice a day. The lessons are put on tape sequentially, none are erased. The lessons follow a consistently tight and firm structure that moves from the simple to the complex in an orderly and logical manner. The combination of the technique of self voice feedback and the nature and structure of the materials results in rapid and lasting learning.

The program described in the previous, has been shown to be very effective with a range of reading and learning disabilities. It improves phonemic processing skills at a rapid rate. It does not require expensive equipment. It is not time intensive. It can be delivered effectively by teachers or classroom aides. It need not interfere unduly with the student's IEP or the curriculum. It can use material from any culture. The student has control over the learning process. It is empowering and quickly raises student self esteem and self confidence.

Thus, although there have been described particular embodiments of the present invention of a new and useful "System and Method for Literacy Development," it is not intended that such references be construed as limitations upon the scope of this invention except as set forth in the following claims.

What is claimed is:

1. A literacy development method for an individual with a voice, comprising:

providing communication materials including supplying a recording and playback device, a first microphone headset, a second microphone headset, and a taping machine for recording lessons, setting up said recording and playback device, placing the first microphone headset on said individual so said individual can hear said voice from said first microphone headset, feeding said voice to said individual at a level and time, controlling said level to suppress a bone conducted transmission of said voice, adjusting said level so that said voice in head in a head midline, and timing said voice to be heard at said head midline, supplying lesson material including establishing a presentation order for said lesson materials to increase effectiveness of said lesson materials, and choosing an appropriate location; and teaching multiple parts of a language by a series program by using the second microphone headset to communicate with the individual, teaching including presenting initial letter sounds, consonant combinations, spelling alternatives, adding endings, making plurals, and spelling rules; wherein said presenting the initial letter sounds including directing lessons towards vowel sounds and consonants, instructing on sound words, instructing on sentence teaching, instructing on spelling word teaching, instructing on writing teaching, and monitoring the progress of said individual; wherein said instructing on sound words includes reading a sound title of a sound word section, reading sound words into said recording and playback device, and segmenting words by sound; wherein said reading sound words into said recording and playback device includes speaking said sound words aloud to form a sound word performance level, analyzing said sound word performance level and, recording said speaking of said sound words once said performance level reaches acceptable parameters; wherein said segmenting words by sound occurs both before and after said reading of said sound words wherein said instructing on sentence teaching includes reading said sentences onto tape including speaking said sentences aloud to form a sentence performance level, analyzing said sentence performance level for fluidity and accuracy, and recording said speaking of said sentences once said performance level reaches acceptable parameters; wherein said instructing on spelling word teaching includes reading a spelling word title onto said recording and playback device, tutoring on non-sense words, tutoring on real words, and tutoring on phonemic processing activities; wherein said tutoring on non-sense words includes saying a non-sense word title into said recording and playback device, and reading said non-sense words into said recording and playback device, wherein said tutoring on real words includes saying a real word title into said recording and playback device; and reading said real words into said recording and playback device; wherein said tutoring on phonemic processing activities includes saying a phonemic processing activity title, presenting phonemic processing material as part of the lesson material, and speaking said phonemic processing material; wherein said instructing on writing teaching includes listening to previously recorded information including a whole sound word, a segmented sound word, a sentence, a nonsense word, and a real word, writing said recorded information, and performing the listening and writing activities again as practice-wherein said writing of said recorded information includes stopping said recording and playback device, translating said recorded information from sound to written words; and marking target sound words, wherein said monitoring the progress of said individual includes listening to individual responses, eliminating superfluous sounds, helping said individual with areas of said method where the individual is having difficulty, reducing said lesson materials for competent students, controlling said recording and playback device during recording, arranging additional practice sessions, and checking practice session results before a next session; wherein said helping said individual with areas of said method where the individual is having difficulty includes assisting with the speaking of words, assisting with the segmenting of words, assisting with sentences, and assisting with phonemic processing; wherein said assisting with the speaking of words includes accepting an initial speaking attempt, analyzing said initial speaking attempt, informing said individual of an incorrect attempt, modeling a correct response when an incorrect attempt occurs, and repeating of said correct response when an incorrect attempt occurs; wherein said assisting with the segmenting of words includes accepting an initial segmenting attempt, analyzing said initial segmenting attempt to ensure that each segment sound is spoken separately, informing said individual of an incorrect segmenting attempt, modeling a correct response when an incorrect segmenting attempt occurs, repeating of said correct response when an incorrect segmenting attempt occurs, and blending said segmenting to form said segmented word; wherein said assisting with sentences includes modeling a sentence in a fluid and accurate manner, repeating of said modeling by said individual, and performing repetitions to achieve fluency; wherein said assisting with phonemic processing includes orally presenting a known word and a letter change, requesting a response to said letter change, analyzing said individual's capability, identifying when said individual is having difficulty, visually presenting said word and said letter change when said individual is having difficulty, modeling a correct response when said individual is having difficulty, repeating of said modeling by said individual when said individual is having difficulty, and reverting to oral presentation after said difficulty is resolved; wherein said controlling said recorder during recording includes recording lesson materials in an accurate manner, spacing segments for playback control, and re-recording incorrect sounds; wherein said re-recording incorrect sounds includes stopping said recording and playback device, rewinding said recording and playback device to a last correct response pattern, and recording said sounds correctly; wherein said arranging additional practice sessions includes analyzing an overall performance level for said individual, and recommending an amount of practice for said individual in accordance with said performance level; wherein said checking practice session results before a next session includes review said practice session results, marking correct and incorrect responses, and correcting said incorrect responses; wherein said teaching multiple parts of a language by a series program, furthermore comprises teaching tough words, and teaching advanced spelling, wherein said teaching tough words includes adding tough-words to said lesson materials, saying a tough word title, and recording tough words, wherein said teaching advanced spelling includes adding spelling exercises for real words; non-sense words, and tough words, spelling said real words, non-sense words, and tough words by said individual, self-checking spelling by said individual, marking correct words, identifying all misspelled words, eliminating misspelled words, and re-writing misspelled words, wherein said teaching multiple parts of a language by a series program, further comprises adding comprehension exercises to said lesson materials, dictating passages for comprehension exercises; wherein said dictating passages for comprehension exercises includes listening to a comprehension passage one sentence at a time, writing each sentence in said passage, listening to questions about said passage, writing said questions, and writing answers to said questions; wherein said comprehension exercises are chosen from class work, a reading book, or text of interest to said individual; wherein said method is taught by a lesson schedule selected form a lesson schedule group including a once a week lesson and a twice a week lesson; wherein said once-a-week lesson includes utilizing one page of spelling per lesson, practicing work at least twice after an initial practice session, and alternating spelling sessions with dictation sessions; wherein said twice-a-week lesson includes giving advanced capable students two pages of spelling for each lesson, practicing an entire taped session once with a instructor, writing said dictation prior to a subsequent session, practicing spelling twice a day, completing phonemic processing without visual access, self-correcting said dictation by said individual, checking said dictation for accuracy, and correcting any mistakes by said individual; and wherein said twice-a-week lesson further includes giving advanced and capable students one page of spelling and taped dictation.

* * * * *